(12) United States Patent
Campbell et al.

(10) Patent No.: US 9,843,687 B2
(45) Date of Patent: Dec. 12, 2017

(54) SYSTEM AND METHOD FOR RADIO AWARE TRAFFIC MANAGEMENT BASED WIRELESS AUTHORIZATION

(71) Applicant: CISCO TECHNOLOGY, INC., San Jose, CA (US)

(72) Inventors: Ian McDowell Campbell, Bow Mar, CO (US); Rajesh S. Pazhyannur, Freemont, CA (US); Mark Grayson, Maidenhead (GB); Alon Ben Ami, Gedera (IL)

(73) Assignee: Cisco Technology, Inc., San Jose, CA (US)

( * ) Notice: Subject to any disclaimer, the term of this patent is extended or adjusted under 35 U.S.C. 154(b) by 127 days.

(21) Appl. No.: 14/536,642

(22) Filed: Nov. 9, 2014

(65) Prior Publication Data

US 2016/0134761 A1 May 12, 2016

(51) Int. Cl.
*H04W 4/00* (2009.01)
*H04M 15/00* (2006.01)
(Continued)

(52) U.S. Cl.
CPC ........ *H04M 15/66* (2013.01); *H04L 12/1407* (2013.01); *H04W 8/18* (2013.01);
(Continued)

(58) Field of Classification Search
None
See application file for complete search history.

(56) References Cited

U.S. PATENT DOCUMENTS 6,483,820 B1 11/2002 Davidson et al.
7,379,739 B2 5/2008 Rajkotia et al.
(Continued)

FOREIGN PATENT DOCUMENTS

CN 102378288 3/2012
CN 105050072 A 11/2015
(Continued)

OTHER PUBLICATIONS

U.S. Appl. No. 14/612,794, filed Feb. 3, 2015, entitled "System and Method for Providing Collaborative Neighbor Management in a Network Environment," Inventors: Nigel Edward Warbuton, et al.
(Continued)

*Primary Examiner* — Bob Phunkulh
(74) *Attorney, Agent, or Firm* — Patterson + Sheridan, LLP

(57) ABSTRACT

An example method is provided in one example embodiment and may include receiving a request from a user equipment (UE) to access a wireless access network, wherein the UE is currently accessing one or more other wireless networks; determining by a Policy and Charging Rules Function (PCRF) whether a subscriber associated with the UE is authorized to access the wireless access network based, at least in part, on a profile for the subscriber; and communicating one of a wireless access rejection and a wireless access acceptance to the UE based on the determination. In some instances, the determining can include recovering the profile for the subscriber associated with the UE from a Subscriber Profile Repository (SPR) using an International Mobile Subscriber Identity (IMSI) for the subscriber.

16 Claims, 7 Drawing Sheets

(51) Int. Cl.
| | |
|---|---|
| *H04W 8/18* | (2009.01) |
| *H04W 48/18* | (2009.01) |
| *H04L 12/14* | (2006.01) |
| *H04W 24/10* | (2009.01) |
| *H04W 48/08* | (2009.01) |
| *H04W 88/06* | (2009.01) |
| *H04W 84/12* | (2009.01) |

(52) U.S. Cl.
CPC ........... *H04W 24/10* (2013.01); *H04W 48/08* (2013.01); *H04W 48/18* (2013.01); *H04W 84/12* (2013.01); *H04W 88/06* (2013.01)

(56) References Cited

U.S. PATENT DOCUMENTS

| | | | |
|---|---|---|---|
| 7,983,667 B2 | 7/2011 | Hart et al. | |
| 8,107,950 B2 | 1/2012 | Amirijoo et al. | |
| 8,320,965 B2 | 11/2012 | Kwun | |
| 8,340,711 B1 | 12/2012 | Glass et al. | |
| 8,588,698 B2 | 11/2013 | Brisebois | |
| 8,611,299 B2 | 12/2013 | Yang et al. | |
| 8,639,243 B2 | 1/2014 | Radulescu et al. | |
| 8,712,459 B2 | 4/2014 | Lim et al. | |
| 8,792,886 B2 | 7/2014 | Meshkati | |
| 8,830,936 B2 | 9/2014 | Ren | |
| 8,917,658 B2* | 12/2014 | Bjork | 370/328 |
| 9,219,816 B2 | 12/2015 | Grayson et al. | |
| 9,226,255 B2 | 12/2015 | Grayson et al. | |
| 9,350,737 B2* | 5/2016 | Fernandez Alonso | H04W 12/08 |
| 2005/0036462 A1 | 2/2005 | Sillasto et al. | |
| 2006/0229087 A1 | 10/2006 | Davis et al. | |
| 2007/0008885 A1 | 1/2007 | Bonner | |
| 2009/0137246 A1 | 5/2009 | Xing | |
| 2009/0305684 A1* | 12/2009 | Jones | H04L 63/20 455/418 |
| 2010/0056184 A1 | 3/2010 | Vakil | |
| 2010/0112982 A1 | 5/2010 | Singh et al. | |
| 2010/0124929 A1 | 5/2010 | Lee | |
| 2010/0135237 A1 | 6/2010 | Papasakellariou | |
| 2010/0157922 A1 | 6/2010 | Kim et al. | |
| 2010/0182955 A1* | 7/2010 | Bjork | H04L 67/16 370/328 |
| 2010/0240314 A1 | 9/2010 | Chang | |
| 2010/0260036 A1 | 10/2010 | Molnar et al. | |
| 2010/0260068 A1 | 10/2010 | Bhatt et al. | |
| 2010/0279628 A1 | 11/2010 | Love et al. | |
| 2011/0110316 A1 | 5/2011 | Chen et al. | |
| 2011/0128913 A1* | 6/2011 | Chowdhury | H04L 63/0892 370/328 |
| 2011/0130144 A1 | 6/2011 | Schein | |
| 2011/0158090 A1* | 6/2011 | Riley | H04L 12/14 370/230 |
| 2011/0170481 A1 | 7/2011 | Gomes | |
| 2011/0177817 A1 | 7/2011 | Hole | |
| 2011/0201333 A1 | 8/2011 | Kwon | |
| 2011/0211514 A1 | 9/2011 | Hamalainin | |
| 2011/0237283 A1 | 9/2011 | Shan et al. | |
| 2011/0267967 A1 | 11/2011 | Ratasuk | |
| 2011/0314178 A1 | 12/2011 | Kanode | |
| 2012/0004003 A1 | 1/2012 | Shaheen et al. | |
| 2012/0015653 A1 | 1/2012 | Paliwal | |
| 2012/0100849 A1 | 4/2012 | Marsico | |
| 2012/0129537 A1 | 5/2012 | Liu et al. | |
| 2012/0191842 A1 | 7/2012 | Hu et al. | |
| 2012/0210003 A1* | 8/2012 | Castro | H04L 12/14 709/225 |
| 2012/0246325 A1* | 9/2012 | Pancorbo Marcos | H04L 12/2602 709/227 |
| 2012/0258720 A1 | 10/2012 | Tinnakornsrisuphap et al. | |
| 2012/0260299 A1* | 10/2012 | Kotecha | H04N 21/2402 725/118 |
| 2012/0265888 A1 | 10/2012 | Roeland et al. | |
| 2012/0269167 A1* | 10/2012 | Velev | H04W 36/0011 370/331 |
| 2012/0276913 A1 | 11/2012 | Lim | |
| 2012/0290452 A1* | 11/2012 | Pancorbo Marcos | H04L 12/1407 705/30 |
| 2012/0327850 A1 | 12/2012 | Wang et al. | |
| 2013/0003697 A1 | 1/2013 | Adjakple et al. | |
| 2013/0077482 A1 | 3/2013 | Krishna et al. | |
| 2013/0114484 A1 | 5/2013 | Suzuki | |
| 2013/0132570 A1* | 5/2013 | Lopez Nieto | H04L 41/0893 709/224 |
| 2013/0136072 A1 | 5/2013 | Bachmann et al. | |
| 2013/0139221 A1* | 5/2013 | Gundavelli | H04W 28/02 726/4 |
| 2013/0155948 A1 | 6/2013 | Pinheiro | |
| 2013/0155954 A1 | 6/2013 | Wang et al. | |
| 2013/0163543 A1 | 6/2013 | Freda et al. | |
| 2013/0182680 A1 | 7/2013 | Choi et al. | |
| 2013/0229945 A1 | 9/2013 | Cha et al. | |
| 2013/0235759 A1 | 9/2013 | Meshkati | |
| 2013/0294356 A1 | 11/2013 | Bala et al. | |
| 2013/0308531 A1 | 11/2013 | So et al. | |
| 2013/0326001 A1 | 12/2013 | Jorgensen et al. | |
| 2013/0337769 A1* | 12/2013 | Bhatia | H04L 41/5022 455/406 |
| 2013/0337821 A1 | 12/2013 | Clegg | |
| 2013/0339783 A1 | 12/2013 | Alonso et al. | |
| 2013/0343288 A1 | 12/2013 | Ratasuk et al. | |
| 2013/0343304 A1 | 12/2013 | Kaippallimalil et al. | |
| 2014/0003225 A1 | 1/2014 | Mann et al. | |
| 2014/0010086 A1 | 1/2014 | Etemad et al. | |
| 2014/0011505 A1 | 1/2014 | Liao | |
| 2014/0016629 A1* | 1/2014 | Pancorbo Marcos | H04L 12/5692 370/338 |
| 2014/0078986 A1 | 3/2014 | Kaippallimalil et al. | |
| 2014/0086226 A1 | 3/2014 | Zhao et al. | |
| 2014/0094139 A1* | 4/2014 | Xu | H04L 41/0893 455/406 |
| 2014/0112251 A1 | 4/2014 | Kim et al. | |
| 2014/0126453 A1 | 5/2014 | Park | |
| 2014/0146732 A1 | 5/2014 | Olufunmilola et al. | |
| 2014/0155109 A1 | 6/2014 | Vaidya et al. | |
| 2014/0177583 A1 | 6/2014 | Aso | |
| 2014/0185537 A1 | 7/2014 | Papasakellariou | |
| 2014/0241316 A1 | 8/2014 | Okmyanskiy et al. | |
| 2014/0254367 A1* | 9/2014 | Jeong | H04L 47/803 370/233 |
| 2014/0287759 A1 | 9/2014 | Purohit | |
| 2014/0287769 A1 | 9/2014 | Taori | |
| 2014/0297888 A1 | 10/2014 | McCann | |
| 2014/0301351 A1 | 10/2014 | Gao | |
| 2014/0307589 A1 | 10/2014 | Li | |
| 2014/0321328 A1 | 10/2014 | Zuniga | |
| 2014/0328266 A1 | 11/2014 | Yu | |
| 2014/0342745 A1 | 11/2014 | Bhushan | |
| 2014/0378131 A1 | 12/2014 | Rui | |
| 2015/0009826 A1* | 1/2015 | Ma | H04W 28/0268 370/235 |
| 2015/0044989 A1* | 2/2015 | De Foy | H04L 12/1478 455/406 |
| 2015/0055588 A1 | 2/2015 | Yerramalli et al. | |
| 2015/0063101 A1* | 3/2015 | Touati | H04W 72/087 370/230 |
| 2015/0103768 A1 | 4/2015 | Chen | |
| 2015/0103772 A1* | 4/2015 | Carnero Ros | H04L 45/04 370/329 |
| 2015/0117347 A1 | 4/2015 | Iwai | |
| 2015/0146594 A1 | 5/2015 | Grayson | |
| 2015/0172471 A1 | 6/2015 | Castro | |
| 2015/0181577 A1 | 6/2015 | Moulsley | |
| 2015/0195858 A1* | 7/2015 | Jin | H04L 41/5051 370/230 |
| 2015/0200760 A1 | 7/2015 | Xia | |
| 2015/0208403 A1 | 7/2015 | Takeda | |
| 2015/0222634 A1* | 8/2015 | Ludwig | H04W 12/08 726/4 |

(56) References Cited

U.S. PATENT DOCUMENTS

| | | | |
|---|---|---|---|
| 2015/0245241 | A1* | 8/2015 | Posz ................ H04W 28/0268 370/235 |
| 2015/0264652 | A1 | 9/2015 | Zhang |
| 2015/0296516 | A1 | 10/2015 | Jung |
| 2015/0333991 | A1* | 11/2015 | Liu .................... H04L 43/0835 455/406 |
| 2015/0365931 | A1 | 12/2015 | Ng et al. |
| 2015/0382386 | A1* | 12/2015 | Castro Castro ....... H04W 48/17 370/329 |
| 2016/0007170 | A1 | 1/2016 | Vaidya et al. |
| 2016/0007316 | A1 | 1/2016 | Vaidya et al. |
| 2016/0007378 | A1 | 1/2016 | Bertorelle |
| 2016/0037490 | A1 | 2/2016 | Pazhyannur et al. |
| 2016/0037550 | A1 | 2/2016 | Barabell |
| 2016/0073282 | A1* | 3/2016 | Speicher ........... H04W 28/0215 370/230 |
| 2016/0073283 | A1 | 3/2016 | Grayson et al. |
| 2016/0073285 | A1 | 3/2016 | Graham et al. |
| 2016/0073328 | A1* | 3/2016 | Li ........................ H04W 48/14 370/328 |
| 2016/0080981 | A1* | 3/2016 | Wang ................ H04W 36/0011 370/331 |
| 2016/0094976 | A1* | 3/2016 | Enomoto ............ H04W 52/283 455/422.1 |
| 2016/0099794 | A1 | 4/2016 | Chendamarai |
| 2016/0105882 | A1 | 4/2016 | Park |
| 2016/0112896 | A1* | 4/2016 | Karampatsis ..... H04W 28/0252 370/230.1 |
| 2016/0127137 | A1 | 5/2016 | Fernandez Alonso |
| 2016/0127564 | A1* | 5/2016 | Sharma ............... H04L 41/0893 455/406 |
| 2016/0135143 | A1 | 5/2016 | Won et al. |
| 2016/0156729 | A1 | 6/2016 | Essigmann |
| 2016/0165494 | A1 | 6/2016 | Warburton et al. |
| 2016/0191631 | A1 | 6/2016 | Haraszti |
| 2016/0212668 | A1* | 7/2016 | Castro Castro ......... H04L 47/20 |
| 2016/0226669 | A1 | 8/2016 | Livanos et al. |
| 2016/0227428 | A1 | 8/2016 | Novlan et al. |
| 2016/0234706 | A1 | 8/2016 | Liu et al. |
| 2016/0234763 | A1 | 8/2016 | Um et al. |
| 2016/0242203 | A1 | 8/2016 | You |
| 2016/0262041 | A1 | 9/2016 | Ronneke |
| 2016/0295357 | A1 | 10/2016 | Grayson et al. |
| 2016/0295521 | A1 | 10/2016 | Grayson et al. |

FOREIGN PATENT DOCUMENTS

| | | |
|---|---|---|
| CN | 105307279 | 2/2016 |
| CN | 105407509 | 3/2016 |
| CN | 105407540 | 3/2016 |
| CN | 105592460 | 5/2016 |
| EP | 2234422 | 9/2010 |
| EP | 2453700 | 5/2012 |
| EP | 2466831 | 6/2012 |
| EP | 2757850 | 7/2014 |
| EP | 2981119 | 2/2016 |
| EP | 2993868 | 3/2016 |
| EP | 2996386 | 3/2016 |
| EP | 3029988 | 6/2016 |
| EP | 3046386 | 7/2016 |
| WO | WO2009/025601 | 2/2009 |
| WO | WO2011/002958 | 1/2011 |
| WO | WO2011/085238 | 7/2011 |
| WO | WO2011/134529 | 11/2011 |
| WO | WO2012/055984 | 5/2012 |
| WO | WO2012/135121 | 10/2012 |
| WO | WO2013/041574 | 3/2013 |
| WO | WO2013/082245 | 6/2013 |
| WO | WO2013/086659 | 6/2013 |
| WO | WO2013/169991 | 11/2013 |
| WO | WO2014/051606 | 4/2014 |
| WO | WO2014/177208 | 11/2014 |
| WO | WO2016/126413 | 8/2016 |
| WO | WO2016/126414 | 8/2016 |

OTHER PUBLICATIONS

"ETSI TS 125 331 V11.10.0 (Jul. 2014) Technical Specification: Universal Mobile Telecommunications System (UMTS); Radio Resource Control (RRC); Protocol Specification," ETSI, 650 Route des Lucioles, F-06921, Sophia Antipolis Cedex-France, Jul. 2014, © European Telecommunications Standards Institute 2014. All Rights Reserved. [Relevant Portions: §7.2.2 pp. 55-58; §8.1.2 pp. 105-108; §8.1.4 pp. 126-129; §8.3.1 pp. 215-260; §8.3.8-8.3.9 pp. 289-292; §8.5.21 pp. 357-365; §10.2.7 pp. 620-623; Annex B.3 pp. 2045-2052].

"TR-196 Femto Access Point Service Data Model," Broadband Forum Technical Report, Issue 2, Issue Date: Nov. 2011, © The Broadband Forum. All Rights Reserved; 46 pages.

"TR-069 CPE WAN Management Protocol," Broadband Forum Technical Report, Issue: 1 Amendment 4, Issue Date: Jul. 2011, Protocol Version 1.3, © The Broadband Forum. All Rights Reserved; 190 pages.

Adrangi, F., et al., "Chargeable User Identity," Network Working Group RFC 4372, Jan. 2006, 10 pages.

"3GPP TR23.705 V0.11.0 (May 2014) Technical Report: 3rd Generation Partnership Project; Technical Specification Group Services and System Aspects; Study on system enhancements for user plane congestion management (Release 13)," 3GPP, 650 Route des Lucioles, F-06921, Sophia Antipolis Cedex-France, May 2014, 64 pages.

"3GPP TS23.002 V12.5.0 (Jun. 2014) Technical Specification: 3rd Generation Partnership Project; Technical Specification Group Services and System Aspects; Network architecture (Release 12)," 3GPP, 650 Route des Lucioles, F-06921, Sophia Antipolis Cedex-France, Jun. 2014; See Sections 1-5, pp. 11-76.

"3GPP TS 29.212 V12.5.2 (Jul. 2014) Technical Specification: 3rd Generation Partnership Project; Technical Specification Group Core Network and Terminals; Policy and Charging Control (PCC); Reference Points (Release 12)," 3GPP, 650 Route des Lucioles, F-06921, Sophia Antipolis Cedex-France, Jul. 2014; Section 4, pp. 17-88.

"ETSI TS 123 401 V9.5.0 (Jun. 2010) Technical Specification: LTE; General Packet Radio Service (GPRS) enhancements for Evolved Universal Terrestrial Radio Access Network (E-UTRAN) access (3GPP TS 23.401 version 9.5.0 Release 9)," ETSI, 650 Route des Lucioles, F-06921, Sophia Antipolis Cedex-France, Jun. 2010; See Section 4, pp. 15-46.

"ETSI TS 123 402 V9.8.0 (Mar. 2011) Technical Specification: Universal Mobile Telecommunications System (UMTS); LTE; Architecture enhancements for non-3GPP accesses (3GPP TS 23.402 version 9.8.0 Release 9)," ETSI, 650 Route des Lucioles, F-06921, Sophia Antipolis Cedex-France, Mar. 2011; See Section 4-6, pp. 14-116.

"Paging Indicator Channel PICH Work in 3G," Teletopix.org, Telecom Techniques Guide, Feb. 13, 2014, 2 pages http://www.teletopix.org/3g-wcdma/paging-indicator-channel-pich-work-in-3g/.

"Paging Channel Selection," UMTS World; first published on or about Jun. 22, 2003; 3 pages http://www.umtsworld.com/technology/paging.html.

Holbrook, H., et al., "Source-Specific-Multicast for IP," Network Working Group RFC 4607, Aug. 2006.

"3GPP TS 36.413 V12.3.0 (Sep. 2014) Technical Specification: 3rd Generation Partnership Project; Technical Specification Group Radio Access Network; Evolved Universal Terrestrial Radio Access Network (E-UTRAN); 51 Application Protocol (S1AP) (Release 12)," [Relevant Sections 9.1.6 and 9.2.3.13 only]; 3rd Generation Partnership Project, Sep. 2014.

"ETSI TS 125 211 V11.5.0 (Jul. 2014) Technical Specification: Universal Mobile Telecommunications System (UMTS); Physical channels and mapping of transport channels onto physical channels (FDD) (3GPP TS 25.211 version 11.5.0 Release 11)," [Relevant Section 7 only]; ETSI, 650 Route des Lucioles, F-06921, Sophia Antipolis Cedex-France, Jul. 2014.

"ETSI TS 123 401 V11.10.0 (Jul. 2014) Technical Specification: LTE; General Packet Radio Service (GPRS) enhancements for

(56) References Cited

OTHER PUBLICATIONS

Evolved Universal Terrestrial Radio Access Network (E-UTRAN) access (3GPP TS 23.401 version 11.10.0 Release 11)," [Relevant Sections 5.3.1.2 and 5.3.4.3 only]; ETSI, 650 Route des Lucioles, F-06921, Sophia Antipolis Cedex-France, Jul. 2014.
"3GPP TS 23.060 V13.0.0 (Sep. 2014) Technical Specification: 3rd Generation Partnership Project; Technical Specification Group Services and System Aspects; General Packet Radio Service (GPRS); Service description; Stage 2 (Release 13)," [Relevant Sections 5.3.20 and 6.2.3 only]; 3rd Generation Partnership Project; Sep. 2014.
"3GPP TS 23.682 V12.2.0 (Jun. 2014) Technical Specification: 3rd Generation Partnership Project; Technical Specification Group Services and System Aspects; Architecture enhancements to facilitate communications with packet data networks and applications (Release 12)," 3rd Generation Partnership Project; Jun. 2014.
"3GPP TS 22.368 V13.0.0 (Jun. 2014) Technical Specification: 3rd Generation Partnership Project; Technical Specification Group Services and System Aspects; Service requirements for Machine-Type Communications (MTC); Stage 1 (Release 13)," 3rd Generation Partnership Project; Jun. 2014.
"3GPP TS 23.887 V12.0.0 (Dec. 2013) Technical Report: 3rd Generation Partnership Project; Technical Specification Group Services and System Aspects; Study on Machine-Type Communications (MTC) and other mobile data applications communications enhancements (Release 12)," 3rd Generation Partnership Project; Dec. 2013.
"3GPP TS 36.300 V12.3.0 (Sep. 2014) Technical Specification: 3rd Generation Partnership Project; Technical Specification Group Radio Access Network; Evolved Universal Terrestrial Radio Access (E-UTRA) and Evolved Universal Terrestrial Radio Access Network 9E-UTRAN); Overall description; Stage 2 (Release 12)," [Relevant Sections 15 and 23 only]; 3rd Generation Partnership Project; Sep. 2014.
"ETSI TS 136 331 V12.3.0 (Sep. 2014) Technical Specificaton: LTE; Evolved Universal Terrestrial Radio Access (E-UTRA); Radio Resource Control (RRC); Protocol specification (3GPP TS 36.311 version 12.3.0 Release 12)," [Relevant Section 5.3.2 only]; ETSI, 650 Route des Lucioles, F-06921, Sophia Antipolis Cedex-France, Sep. 2014.
"3GPP TS 29-272 V12-6-0 (Sep. 2014) Technical Specification: 3rd Generation Partnership Project; Technical Specification Group Core Network and Terminals; Evolved Packet System (EPS); Mobility Management Entity (MME) and Serving Gprs Support Node (SGSN) related interfaces based on Diameter protocol (Release12)," [Relevant Sections 5 and 7.3.1-7.3.21 only]; 3rd Generation Partnership Project; Sep. 2014.
"ETSI TS 129 213 V12.5.0 (Oct. 2014) Technical Specification: Digital Cellular Telecommunications System (Phase 2+); Universal Mobile Telecommunications System (UMTS); LTE; Policy and charging control signalling flows and Quality of Service (QoS) parameter mapping (3GPP TS 29.213 version 12.5.0 Release 12)," [Relevant Sections 3, 4, 8, and 8 only], ETSI, 650 Route des Lucioles, F-06921, Sophia Antipolis Cedex-France, Oct. 2014.
"ETSI TS 129 214 V12.5.0 (Oct. 2014) Technical Specification: Universal Mobile Telecommunications System (UMTS); LTE; Policy and charging control over Rx reference point (3GPP TS 29.214 version 12.5.0 Release 12)," ETSI, 650 Route des Lucioles, F-06921, Sophia Antipolis Cedex-France, Oct. 2014; 64 pages.
"ETSI TS 136 133 V12.5.0 (Nov. 2014) Technical Specification: LTE; Evolved Universal Terrestrial Radio Access (E-UTRA); Requirements for support of radio resource management (3GPP TS 36.133 version 12.5.0 Release 12)," [Relevant Sections 8-10 only]; ETSI, 650 Route des Lucioles, F-06921, Sophia Antipolis Cedex-France, Nov. 2014.
"ETSI TS 125 469 V11.2.0 (Apr. 2013) Technical Specification: Universal Mobile Telecommunications System (UMTS); UTRAN Iuh interface Home Node B (HNB) Application Part (HNBAP) signaling (3GPP TS 25.469 version 11.2.0 Release 11)," © European Telecommunications Standards Institute 2013; Apr. 2013; 78 pages.
"ETSI TS 125 469 V9.3.0 (Oct. 2010) Technical Specification: Universal Mobile Telecommunications System (UMTS); UTRAN Iuh interface Home Node B (HNG) Application Part (HNBAP) signaling (3GPP TS 25.469 version 9.3.0 Release 9)," © European Telecommunications Standards Institute 2010; Oct. 2010; 64 pages.
"ETSI TS 123 401 V12.70 (Jan. 2015) Technical Specification: LTE; General Packet Radio Service (GPRS) enhancements for Evolved Universal Terrestrial Radio Access Network (E-UTRAN) access (EGPP TS 23.401 version 12.7.0 Release 12)," Section 4 only, European Telecommunications Standards Institute, 650 Route des Lucioles, F-06921 Sophia Antipolis Cedex, France; Jan. 2015; 77 pages.
"ETSI TS 125 367 V9.4.0, Universal Mobile Telecommunications System (UMTS); Mobility procedures for Home Node B (HNB); Overall description; Stage 2 (3GPP TS25.367 version 9.4.0 Release 9)", European Telecommunications Standards Institute, 650 Route des Lucioles, F-06921 Sophia Antipolis Cedex, France, Jun. 2010; 17 pages.
"LTE Quick Reference: Resource Allocation and Management Unit," LTE Handbook, Share Technote, first published on or about Jul. 13, 2012 http://www.sharetechnote.com/html/Handbook_LTE_ResourceAllocation_ManagementUnit.html.
"Broadband Forum Technical Report: TR-196 Femto Access Point Service Data Model," Issue: 1, Issue Date: Apr. 2009, © The Broadband Forum; 131 pages.
"PDCCH Construction, Expert Opinion," posted by Hongyan on May 20, 2011; LTE University, 4 pages http://lteuniversity.com/get_trained/expert_opinion1/b/hongyanlei/archive/2011/05/20/pdcch-construction.aspx.
"PDCCH Processing," published by Gio Zakradze on Dec. 29, 2014; 56 pages.
"Cisco Licensed Small Cell Solution: Reduce Costs, Improve Coverage and Capacity—Solution Overview," Cisco Systems, Inc., C22-726686-00, Feb. 2013, © 2013 Cisco and/or its affiliates. All Rights Reserved. Printed in USA, 13 pages.
"Extensible Authentication Protocol," Wikipedia, the free encyclopedia, Sep. 16, 2013, 10 pages http://en.wikipedia.org/wiki/Extensible_Authentication_Protocol#EAP-FAST.
"Link Layer Discovery Protocol," Wikipedia, the free encyclopedia, Sep. 25, 2013, 4 pages, http://en.wikipedia.org/wiki/Link_Layer_Discovery_Protocol.
"RADIUS," Wikipedia, the free encyclopedia, Sep. 26, 2013, 12 pages http://en.wikipedia.org/wiki/RADIUS.
Ashraf, Imran, "Distributed Radio Coverage Optimization in Enterprise Femtocell Networks," International Conference on Communications ICC 2010, May 23-27, 2010, Cape Town, South Africa; 6 pages.
Calhoun, P., "Diameter Base Protocol," Network Working Group RFC 3488, Sep. 2003; 147 pages.
Claussen, Holger, et al., "Self-optimization of Coverage for Femtocell Deployments," DOI 10:10.1109/WTS2008 Wireless Telecommunications Symposium, Apr. 26-28, 2008; Pomona, CA; 8 pages.
Haverinen, H., "Extensible Authentication Protocol Method for Global System for Mobile Communications (GSM) Subscriber Identity Modules (EAP-SIM)," Network Working Group RFC 4186, Jan. 2006, 93 pages.
Horn, Gavin, "3GPP Femtocells: Architecture and Protocols," Qualcomm Incorporated, 5775 Morehouse Drive, San Diego, CA, Sep. 2010; 64 pages.
Nivaggioli, Patrice, "Cisco Small Cell Architecture," Cisco Connect, Dubrovnik, Croatia, South East Europe, May 20-22, 2013, © 2012 Cisco and/or its affiliates. All Rights Reserved.; 40 pages.
EPO Dec. 15, 2015 Extended Search Report and Written Opinion from European Application Serial No. 15178914.6.
Ratasuk, Rapeepat, et al., "License-exempt LTE Deployment in Heterogeneous Network," 2012 International Symposium on Wireless Communications Systems (ISWCS), Aug. 28, 2012, pp. 246-250.

(56) References Cited

OTHER PUBLICATIONS

Almeida, Erika, et al., "Enabling LTE/Wifi Coexistence by LTE Blank Subframe Allocation," 2013 IEEE International Conference on Communications (ICC), Jun. 9, 2013, pp. 5083-5088.
Saad, Sawsan A., et al., "A Survey on Power Control Techniques in Femtocell Networks," Journal of Communications vol. 8, No. 12, Dec. 2013; 10 pages.
EPO Feb. 8, 2016 Extended Search Report and Written Opinion from European Application Serial No. 15183583.2.
3GPP TSG-RAN WG3 Meeting #73bis R3-112481, "Issues Related to Cell RACH Support for HNB Handover," Alcatel-Lucent, 3GPP Draft, Zhuhai, China, Oct. 10-14, 2011; 10 pages.
3GPP TSG-RAN3 Meeting #69 R3-102094, "Text Proposal for HNBRAP," Alcatel-Lucent, 3GPP Draft, Madrid, Spain, Aug. 23-27, 2010; 62 pages.
"3GPP TS 29.274 V12-6-0 (Sep. 2014) Technical Specification: 3rd Generation Partnership Project; Technical Specification Group Core Network and Terminals; 3GPP Evolved Packet System (EPS); Evolved General Packet Radio Service (GPRS) Tunnelling Protocol for Control plane (GTPv2-C); Stage 3 (Release 12)," [Relevant Sections 4-6; 7.1-7.2.15; and 8.1-8.21.6 only]; 3rd Generation Partnership Project; Sep. 2014.
"GSMA LTE Roaming Guidelines, Version 9.0," GSM Association, Official Document IR88, Jan. 24, 2013; 53 pages.
Guttman, E., et al., "Service Location Protocol, Version 2," Network Working Group RFC 2608, Jun. 1999, 57 pages.
Tayal, "All About PDCCH and CCE Allocation—PDCCH (Physical downlink Control Channel)," Tayal's Way to Learn LTE, May 2013; 14 pages http://nitintayal-lte-tutorials.blogspot.com/2013/03/all-about-pdcch-and-ccc-allocation.html.
U.S. Appl. No. 14/534,792, filed Nov. 6, 2014, entitled "System and Method for Providing Message Delivery and Paging to a Group of Users in a Network Environment," Inventors: Maulik Vijay Vaidya, et al.
U.S. Appl. No. 14/450,040, filed Aug. 1, 2014, entitled "System and Method for Media Access Control Scheduler for a Long Term Evolution Unlicensed Network Environment," Inventors: Rajesh S. Pazhyannur, et al.
U.S. Appl. No. 14/480,284, filed Sep. 8, 2014, entitled "System and Method for Internet Protocol Version-Based Multiple Access Point Name Support in a Network Environment," Inventors: Mark Grayson, et al.
U.S. Appl. No. 14/481,654, filed Sep. 9, 2014, entitled "System and Method for Supporting Cell Updates Within Small Cell Cluster for Mobility in Cell Paging Channel Mode," Inventors: Mickael Graham, et al.
U.S. Appl. No. 14/534,883, filed Nov. 6, 2014, entitled "System and Method for Providing Message Delivery and Paging to a Group of Users in a Network Environment," Inventors: Maulik Vijay Vaidya, et al.
U.S. Appl. No. 14/597,036, filed Jan. 14, 2015, entitled "System and Method for Providing Collision-Avoided Physical Downlink Control Channel Resource Allocation in a Network Environment," Inventors: Qing Zhao, et al.
U.S. Appl. No. 14/612,827, filed Feb. 3, 2015, entitled "System and Method for Providing Policy Charging and Rules Function Discovery in a Network Environment," Inventors: Konstantin Livanos, et al.
U.S. Appl. No. 14/614,500, filed Feb. 5, 2015, entitled "System and Method for Providing Policy Charging and Rules Function Discovery in a Network Environment," Inventors: Konstantin Livanos, et al.
"3GPP TR 23.852 (V12.0.0 (Sep. 2013) Technical Report: 3rd Generational Partnership Project; Technical Specification Group Services and System Aspects; Study on S2a Mobility based on GPRS Tunnelling Protocol (GTP) and Wireless Local Area Network (WLAN) access to the Enhanced Packet Core (EPC) network (SaMOG); Stage 2 (Release 12);" 3rd Generation Partnership Project (3GPP), Sep. 2013, 157 pages.
Drome, R., "Dynamic Host Configuration Protocol," Network Working Group RFC 2131, Mar. 1997; 45 pages.
Leung, K., et al., "WiMAX Forum/3GPP2 Proxy Mobile IPv4," Independent Submission RFC 5563, Feb. 2010; 41 pages.
Narten, T., et al., "Neighbor Discovery for IP version 6 (IPv6)," Network Working Group RFC 4861, Sep. 2007; 97 pages.
"LTE Quick Reference: CCE Index Calculation," LTE Handbook, Share Technote, http://www.sharetechnote.com/html/Handbook_LTE_CCE+Index.html First Published on or about Jul. 8, 2012.
EPO Jan. 29, 2016 Extended Search Report and Written Opinion from European Application Serial No. 15180616.
Gundavelli, M., et al., "Multiple APN Support for Trusted Wireless LAN Access," NETEXT-WG Internet Draft, draft-gundavelli-netext-multiple-apn-pmipv6-01.txt, Feb. 22, 2012; 15 pages.
"3GPP TS 23.402 V12.5.0 (Jun. 2014) Technical Specification: 3rd Generation Partnership Project; Technical Specification Group Services and System Aspects; Architecture enhancements for non-3GPP accesses (Release 12);" 3GPP, 650 Route des Lucioles; F-05921 Sophia-Antipolis Cedex, France; Jun. 2014; 291 pages.
SA-WG2 Meeting #92, S2-123194 (Revision of Sw-122735), Juniper Networks, Barcelona, Spain, Jul. 9-13, 2012; 13 pages.
EPO Mar. 11, 2016 Extended Search Report and Written Opinion from European Application Serial No. 15193713.
"3GPP TS 23.203 V7.3.0 (Jun. 1, 2007) Technical Specification: 3rd Generation Partnership Project; Group Services and System Aspects; Policy and charging control architecture (Release 7)," 3GPP, 650 Route des Lucioles; F-05921 Sophia-Antipolis Cedex, France; Jun. 1, 2007.
PCT Apr. 6, 2016 International Search Report and Written Opinion of the International Searching Authority from International Application No. PCT/US2016/013931.
"3GPP TS 29.213 V13.0.0 (Jan. 5, 2015) Technical Specification: 3rd Generation Partnership Project; Technical Specification Group Core Network and Terminals; Policy and Charging Control signalling flows and Quality of Service (QoS) parameter mapping (Release 13)," 3GPP, 650 Route des Lucioles; F-05921 Sophia-Antipolis Cedex, France; Jan. 5, 2015.
PCT Apr. 6, 2016 International Search Report and Written Opinion of the International Searching Authority from International Application No. PCT/US2016/013934.
3GPP TSG-CT WG3 Meeting #80, C3-150092, 29.213 CR0593, 3GPP Draft; Current Version 13.0.0; Huawei, et al.; Sorrento, Italy Feb. 2-6, 2015.
EPO Apr. 28, 2016 Extended Search Report and Written Opinion from European Application Serial No. 15195895.
EPO Jun. 7, 2016 Extended Search Report and Written Opinion from European Application Serial No. 16150351.
"Cisco ASR 5000 Series Small Cell Gateway," Cisco White Paper, C11-711704-00, Jul. 2012, Cisco Systems, Inc., Printed in USA, © 2012 Cisco and/or its affiliates. All Rights Reserved. 6 pages.
"Cisco EnergyWise Management Suite—Data Sheet," Cisco Systems, Inc., C78-729774-00, Oct. 2013 © 2013 Cisco and/or its affiliates. All Rights Reserved. Printed in USA, 4 pages.
"3GPP TS 23.203 V13.1.0 (Sep. 2014) Technical Specification: 3rd Generation Partnership Project; Technical Specification Group Services and System Aspects; Policy and charging control architecture (Release 13)," [Relevant Sections 1-6 only]; 3rd Generation Partnership Project, Sep. 2014.
"3GPP TS 32.522 v11.2.0, 3rd Generation Partnership Project Technical Specification: Group Services and System Aspects; Telecommunication management; Self-Organizing Networks (SON) Policy Network Resource Model (NRM) Integration Reference Point (IRP); Information Service (IS) (Release 11)," 3GPP, 650 Route des Lucioles, F-06921 Sophia Antipolis Valbonne, France, Jun. 2012, 35 pages.
3GPP TSG-RAN WG3 #61bis, R3-081174, "Solution for interference reduction SON use case," Orange, Alcatel-Lucent, Agenda Item 10.1.1c; Kansas City, MO, USA; 6 pages.
3GPP-TSG-RAN WG3 Meeting #60, R3-081123, "Dynamic Setup of HNBs for Energy Savings and Interference Reduction," Mitsubishi Electric, Agenda Item 10.1.1c; Kansas City, MO USA, May 5-9, 2008; 6 pages.

(56) References Cited

OTHER PUBLICATIONS

3GPP-TSG-RAN3 #59, R3-080082, "Capacity and Coverage SON Use Case," Alcatel-Lucent, Agenda Item 10.1.1.c; Sorrento, Italy, Feb. 11-15, 2008; 4 pages.
"ETSI TS 123 007 V12.6.0 (Oct. 2014) Technical Specification: Digital Cellular Telecommunications System (Phase 2+); Universal Mobile Telecommunications System (UMTS); LTE; Restoration procedures (EGPP TS 23.007 version 12.6.0 Release 12)," ETSI, 650 Route des Lucioles, F-06921, Sophia Antipolis Cedex-France, Oct. 2014; 93 pages.
"ETSI TS 123 401 V12.6.0 (Sep. 2014) Technical Specification: LTE; General Packet Radio Service (GPRS) enhancements for Evolved Universal Terrestrial Radio Access Network (E-UTRAN) access (3GPP TS 23.401 version 12.6.0 Release 12)," ETSI, 650 Route des Lucioles, F-06921, Sophia Antipolis Cedex-France, Sep. 2014; 308 pages.
"ETSI TS 129 061 V12.7.0 (Oct. 2014) Technical Specification: Digital cellular telecommunications system (Phase 2+); Universal Mobile Telecommunications System (UMTS); LTE; Interworking between the Public Land Mobile Network (PLMN) supporting packet based services and Packet Data Networks (PDN) (3GPP TS 29.061 version 12.7.0 Release 12)," ETSI, 650 Route des Lucioles, F-06921, Sophia Antipolis Cedex-France, Oct. 2014; 170 pages.
"ETSI TS 129 212 V12.6.0 (Oct. 2014) Technical Specification: Universal Mobile Telecommunications System (UMTS); LTE; Policy and Charging Control (PCC); Reference Points (EGPP TS 29.212 version 12.6.0 Release 12)," ETSI, 650 Route des Lucioles, F-06921, Sophia Antipolis Cedex-France, Oct. 2014, 232 pages.

* cited by examiner

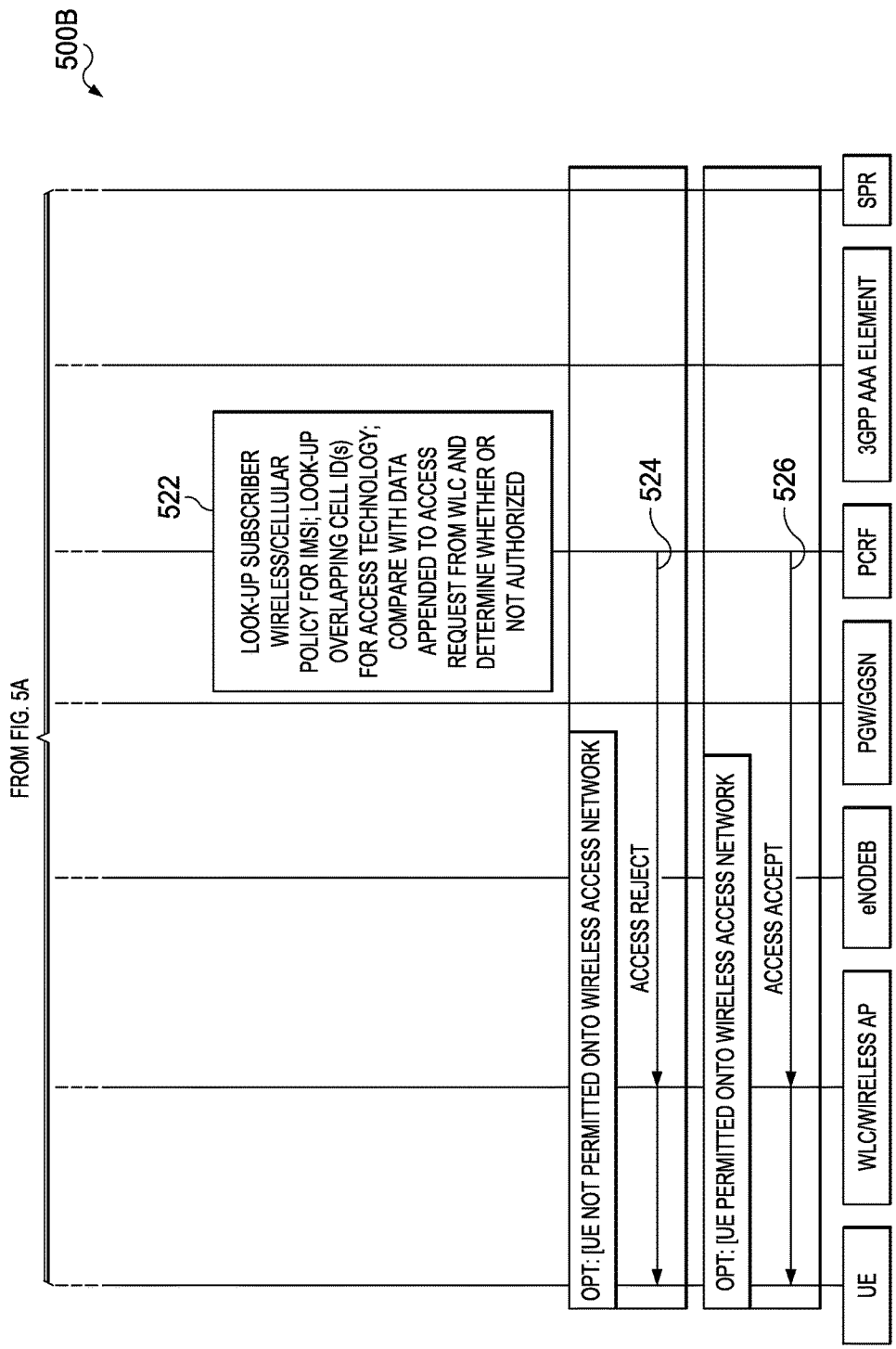

SYSTEM AND METHOD FOR RADIO AWARE TRAFFIC MANAGEMENT BASED WIRELESS AUTHORIZATION

TECHNICAL FIELD

This disclosure relates in general to the field of communications and, more particularly, to a system and method for Radio Aware Traffic Management (RATM) based wireless authorization.

BACKGROUND

Networking architectures have grown increasingly complex in communication environments. Mobile communication networks have grown substantially in subscriber base as end users become increasingly connected to mobile wireless environments. As the number of mobile subscribers increases, efficient management of communication resources becomes more critical. In some instances, users can access a communication network simultaneously using multiple wireless networks. However, there may be differences in resources, throughput, congestion and/or other characteristics for the wireless networks. Accordingly, there are significant challenges in managing access to wireless networks.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which:

FIGS. 5A-5B are simplified flow diagrams illustrating potential flows and activities associated with providing RATM based enhanced wireless authorization determinations for a subscriber including load based authorization determinations in accordance with one potential embodiment of the communication system.

DETAILED DESCRIPTION OF EXAMPLE EMBODIMENTS

Overview

Figure 1:
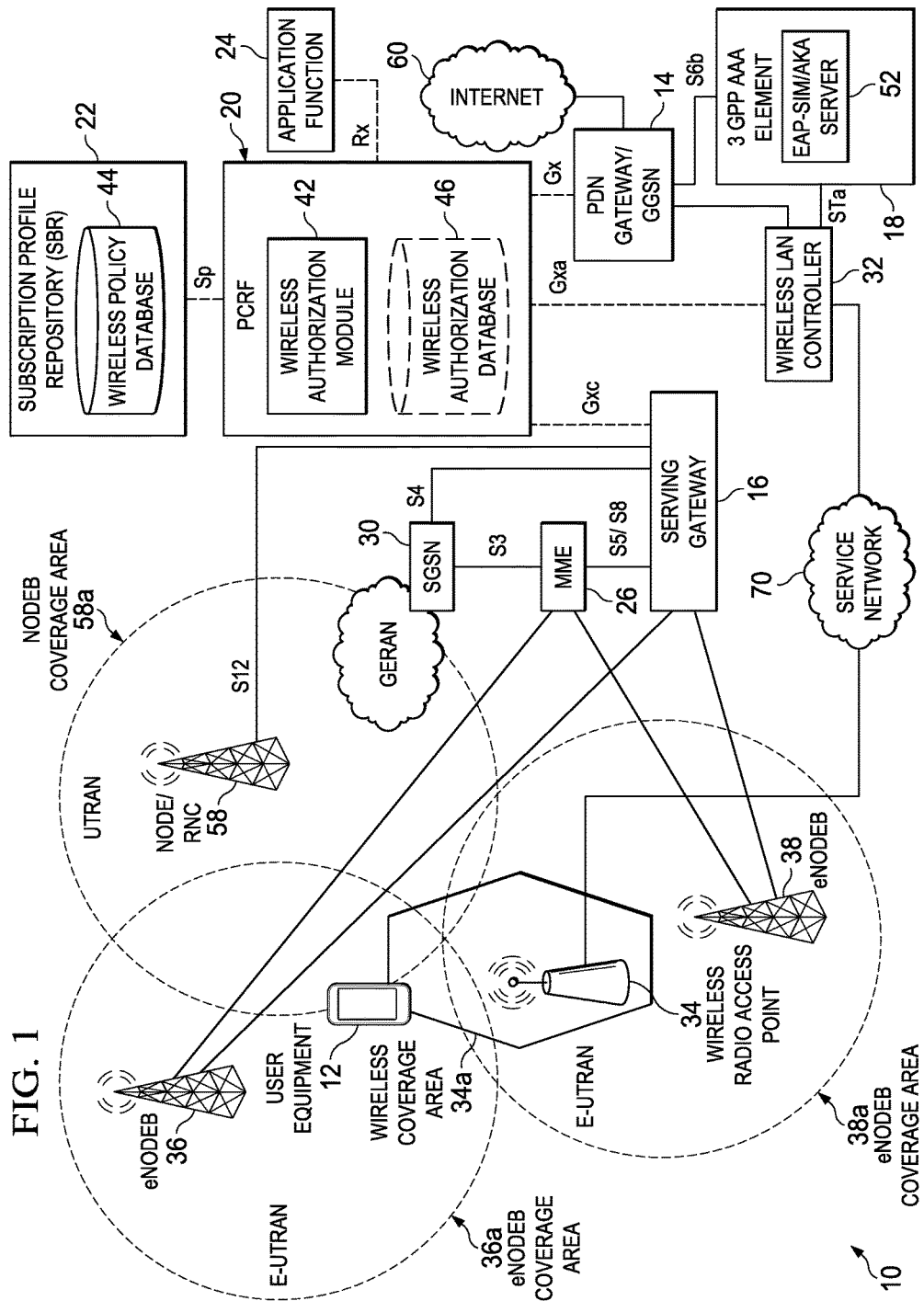
FIG. 1 is a simplified block diagram illustrating a communication system to facilitate providing RATM based enhanced wireless authorization determinations according to one embodiment of the present disclosure.

A method for a communication network is provided in one example embodiment and can include receiving a request from a user equipment (UE) to access a wireless access network, wherein the UE is currently accessing one or more other wireless networks; determining by a Policy and Charging Rules Function (PCRF) whether a subscriber associated with the UE is authorized to access the wireless access network based, at least in part, on a profile for the subscriber; and communicating one of a wireless access rejection and a wireless access acceptance to the UE based on the determination. In some instances, the determining can include recovering the profile for the subscriber associated with the UE from a Subscriber Profile Repository (SPR) using an International Mobile Subscriber Identity (IMSI) for the subscriber.

In some instances, the profile for the subscriber can indicate at least one of: whether the subscriber is allowed to access the wireless access network; whether the subscriber is allowed to access the wireless access network in combination with accessing another wireless network using a particular Radio Access Technology (RAT) type; and whether the subscriber is allowed to access the wireless access network in combination with accessing another wireless network using a particular RAT type for one or more network conditions. In some instances, the one or more network conditions can include at least one of: whether a received signal strength indicator (RSSI) for the UE is above, below or equal to a particular RSSI threshold; whether a received channel power indicator (RCPI) for the UE is above, below or equal to a particular RCPI threshold; whether a received signal to noise indicator (RSNI) for the UE is above, below or equal to a particular RSNI threshold; whether a load of a particular RAT type is above, below or equal to a particular load threshold; and whether at least one of an RSSI, RCPI or RSNI for the UE is within a predetermined range and whether a load of a particular RAT type is above, below or equal to a particular load threshold. In other instances, the particular RAT type can include at least one of: a Global System for Mobile communications (GSM) Enhanced Data rates for GSM Evolution (EDGE) Radio Access Network (GERAN) RAT type; a Universal Mobile Telecommunications System (UMTS) Terrestrial Radio Access Network (UTRAN) RAT type; and an evolved UTRAN (E-UTRAN) RAT type.

In some cases, the method can include configuring at least one memory element in the PCRF with a list of one or more wireless radio access points in the wireless access network in relation to cell information for one or more cells of one or more Radio Access Technology (RAT) types of the one or more other wireless networks, wherein each of the one or more cells provide a coverage area overlapping each of the one or more wireless radio access points. In other cases, the method can include configuring at least one memory element in the PCRF with one or more predicted load thresholds for one or more cells one or more Radio Access Technology (RAT) types of the one or more other wireless networks, wherein each of the one or more cells provide a coverage area overlapping each of one or more wireless radio access points in the wireless access network.

Example Embodiments

Turning to FIG. 1, FIG. 1 is a simplified block diagram illustrating a communication system 10 to facilitate providing RATM based enhanced wireless authorization determinations in a network environment according to one embodiment of the present disclosure. This particular configuration may be tied to the 3rd Generation Partnership Project (3GPP) Evolved Packet System (EPS) architecture, also sometimes referred to as the Long-term Evolution (LTE) EPS architecture. Alternatively, the depicted architecture may be applicable to other environments equally.

The example architecture of FIG. 1 may include end users operating user equipment (UE) 12 and a packet data network (PDN) gateway (PGW)/gateway General Packet Radio Service (GPRS) support node (GGSN) 14, which may have a logical connection to a serving gateway (SGW) 16. Also provided are a 3GPP Authentication, Authorization and Accounting (AAA) element 18 and a serving GPRS support node (SGSN) 30, which may both interface with PGW/GGSN 14. 3GPP AAA element may support wireless extensible authorization protocol (EAP) subscriber identity module (EAP-SIM) authentication techniques and/or EAP-authentication and key agreement (EAP-AKA) authentication techniques via an EAP-SIM/AKA server 52. 3GPP AAA element 18 may also interface with a wireless Local Area Network (LAN) controller (WLC) 32. As used herein in this Specification, the terms 'user equipment,' 'user', 'end user' and 'subscriber' are interchangeable.

SGW 16 may also have logical connections to evolved Node Bs (eNodeBs) 36, 38, to a Mobility Management Entity (MME) 26, to a Node B (NodeB)/Radio Network Controller (RNC) 58 and to SGSN 30. A Policy and Charging Rules Function (PCRF) 20, which may include a wireless authorization module 42, can interface with PGW/GGSN 14, SGW 16, WLC 32, a Subscription Profile Repository (SPR) 22 and an Application Function (AF) 24. SPR 22 may be provisioned with a wireless policy database 44. PGW/GGSN 14 may further interface with an internet 60 and WLC 32. WLC 32 may additionally interface with a wireless radio access point (AP) 34 via a service network 70. Note, as used herein in this Specification the terms 'wireless radio AP', 'wireless AP' and 'WiFi AP' can be used interchangeably. Note additionally that the terms 'wireless' and 'WiFi' can be used interchangeably. The combination of wireless radio AP 34 and WLC 32 may form wireless access network for communication system 10.

Each of the elements of FIG. 1 may couple to one another through simple interfaces (as illustrated) or through any other suitable connection (wired or wireless), which provides a viable pathway for network communications. Additionally, any one or more of these elements may be combined or removed from the architecture based on particular configuration needs. For example, communication system 10 may include a configuration capable of transmission control protocol/Internet protocol (TCP/IP) communications for the transmission or reception of packets in a network. Communication system 10 may also operate in conjunction with a user datagram protocol/IP (UDP/IP) or any other suitable protocol where appropriate and based on particular needs.

Also shown in FIG. 1 are various coverages areas for eNodeBs 36, 38 and wireless radio AP 34. An eNodeB coverage area 36a may correspond to a cellular coverage area provided by eNodeB 36; an eNodeB coverage area 38a may correspond to a cellular coverage area provided by eNodeB 38; a NodeB coverage area 58a may correspond to a cellular coverage provided by NodeB/RNC 58 and a wireless coverage area 34a may correspond to a wireless coverage area provided by wireless AP 34. Note the coverage areas shown in FIG. 1 are provided for illustrative purposes only to illustrate certain features of communication system 10 and are not meant to limit the broad scope of the present disclosure. Although only one wireless AP 36 is shown in FIG. 1, it should further be understood that additional wireless APs can be deployed in communication system 10 to form a wireless LAN (WLAN), metropolitan area network (MAN) and/or wide area network (WAN).

In general terms, 3GPP defines the Evolved Packet System (EPS) as specified in Technical Specification (TS) 23.002, 23.401, etc. The EPS generally consists of UE access networks and an Evolved Packet Core (EPC). Access networks may be 3GPP access networks including legacy access networks such as Global System for Mobile communications (GSM) Enhanced Data rates for GSM Evolution (EDGE) Radio Access Network (GERAN), UMTS Terrestrial Radio Access Network (UTRAN), generally referred to as 3G, and/or LTE access networks such as Evolved UTRAN (E-UTRAN), generally referred to as 4G/LTE/LTE-Advanced (LTE-A), or they may be non-3GPP IP access networks such as digital subscriber line (DSL), Cable, Worldwide Interoperability for Microwave Access (WiMAX), code division multiplex access (CDMA) 2000, WiFi, or the Internet. In various embodiments, eNodeBs 36, 38 may provide cellular coverage for 4G/LTE/LTE-A Radio Access Networks (RANs) (e.g., E-UTRAN). In various embodiments, NodeB/RNC 58 may provide cellular coverage for 2G and/or 3G RANs (e.g., UTRAN, GERAN). Note the term 'wireless network' may be used herein in this Specification to collectively refer to 3GPP access networks such as, for example, 2G, 3G and/or 4G/LTE/LTE-A access networks and non-3GPP IP access networks such as, for example, WiFi and/or WiMAX.

In various embodiments, wireless radio AP 34 and wireless LAN controller 32 may collectively form a WLAN to provide access to one or more non-3GPP IP access networks (e.g., wireless access networks) via one or more wireless radio technologies such as, for example WiFi and/or WiMAX. Non-3GPP IP access networks can be divided into trusted and untrusted segments. For the trusted segment, a viable relationship exists between a wireless access network and the core network. Trusted IP access networks support mobility, policy and AAA interfaces to the EPC, whereas untrusted networks do not. Instead, access from untrusted access networks is done via an evolved packet data gateway (ePDG) (not shown), which can provide for security associations to the UE over an untrusted IP access network. In various embodiments, wireless radio AP 34 and wireless LAN controller 32 may collectively form a trusted WLAN.

Also provided in the architecture of FIG. 1 are a series of interfaces, which can offer mobility, policy control, AAA functions and/or charging activities (offline and online) for various network elements. For example, interfaces can be used to exchange point of attachment, location, and/or access data for one or more end users, for example, users operating UE 12. Resource, accounting, location, access network information, network address translation (NAT) control, etc. can be exchanged using a remote authentication dial in user service (RADIUS) protocol or any other suitable protocol where appropriate. Other protocols that can be used in communication system 10 can include DIAMETER protocol, service gateway interface (SGI), terminal access controller access-control system (TACACS), TACACS+, etc.

As shown in FIG. 1, a DIAMETER-based interface, Rx, may be maintained between AF 24 and PCRF 20. In various embodiments, the Rx interface could be augmented to provide for access policy functionality. PCRF 20 may provision policy charging and control (PCC) rules for PGW/GGSN 14 using a DIAMETER-based Gx interface. Communication system 10 may be configured with additional DIAMETER-based interfaces to manage policy and control between various elements of the system 10. For example, a DIAMETER-based Gxa interface may be maintained between PCRF 20 and wireless LAN controller 32; a DIAMETER-based Gxc interface may be maintained between PCRF 20 and SGW 16; and a DIAMETER-based Sp interface may be maintained between SPR 22 and PCRF 20. Further, a DIAMETER-based interface STa may be maintained between 3GPP AAA element 18 and wireless LAN controller 32 [note the interface may be an SWa interface for untrusted non-3GPP IP access networks) and a DIAMETER-based S6b interface may be maintained between 3GPP AAA element 18 and PGW/GGSN 14. In various embodiments, the Gxa interface may also be implemented using a RADIUS protocol. Other signaling interfaces are illustrated between various components of FIG. 1, according to 3GPP standards, which are not described in detail for purposes of brevity.

Before detailing further operations and infrastructure of various elements of FIG. 1, certain contextual information is provided to offer an overview of wireless access as generally provided in commercial architectures. Such information is offered earnestly and for teaching purposes only and, therefore, should not be construed in a way to limit the broad applications for the present disclosure.

Simultaneous access to multiple wireless networks (e.g., 3GPP access networks and wireless access networks) is leading to use cases where a level of co-ordination for optimized authorization and/or policy decisions related to WiFi access are needed. For example, in a scenario where both WiFi and cellular services are available and a handset is capable of both cellular and WiFi services, improved/optimized authorization and/or policy decisions may be needed to provide improved user experience for WiFi and cellular services. One motivation for improving authorization and/or policy decisions may be to manage transitions to WiFi access points whenever WiFi performance falls below cellular performance. For example, 802.11n may outperform LTE at close distances to a WiFi access point; however, this performance may fall as a user moves closer to the edge of the coverage area for the WiFi access point. This degradation in WiFi performance may be impacted in scenarios where coverage areas for WiFi access points may not overlap. In such scenarios, it may be beneficial to push users to access cellular services in order to provide improved user experience.

In accordance with one embodiment, communication system 10 can overcome the aforementioned shortcomings (and others) by providing a solution including an enhanced RATM architecture, which may provide enhanced service provider (SP) wireless (e.g., WiFi) authorization and policy decisions. In general, the solution provided by communication system 10, which may provide for enhanced SP WiFi authorization and policy decisions can be used for determining whether a subscriber associated with a given UE (e.g., UE 12) can access the wireless (e.g., WiFi) access network provided via wireless radio AP 34 and WLC 32.

In various embodiments, the solution may include enhancing SPR 22 with per subscriber policy information related to WiFi authorization via wireless policy database 44 and enhancing PCRF 20 with the capability to proxy a WiFi extensible authorization protocol (EAP) request for UE 12 via wireless authorization module 42. For example WiFi authorization for UE 12 (e.g. the subscriber associated with UE 12) may be proxied via cellular PCRF 20 with 3GPP AAA element 18 via EAP-SIM/AKA server 52 to determine whether the UE (e.g., subscriber) is authorized to access wireless radio AP 34. In various embodiments, the solution may include enhancing 3GPP AAA element 18 to communicate subscriber policy information related to WiFi authorization for storage in SPR 22 (e.g., via wireless policy database 44) and enhancing PCRF 20 to read/recover the policy information accordingly.

Using PCRF 20 as a proxy for the WiFi EAP-SIM/AKA can help to ensure that an International Mobile Subscriber Identity (IMSI) (and/or Mobile Subscriber Integrated Services Digital Network (ISDN) Number (MSISDN) for the subscriber associated with UE 12 may be signaled to PCRF 20. PCRF 20 can further be enhanced with capabilities to associate the EAP-SIM dialogue and authentication decision from 3GPP AAA element 18 with Gx signaling for the UE from PGW/GGSN 14.

During operation, for example, PCRF 20 can recover the subscriber's profile from SPR 22 using the subscriber's IMSI, which, along with cellular access information for the UE, can be obtained from standardized 3GPP Gx signaling via an initial Credit Control Request, generally referred to as a 'CCRi' for a Tracking Area Update (TAU) and/or Attach request for a cellular network. The CCRi may include the subscriber's IMSI as well as well as the Radio Access Technology (RAT) type (e.g., 2G, 3G, 4G, etc.) for the TAU/Attach request. In one embodiment for determining whether the UE can access the WiFi access network including wireless radio AP and WLC 32, the EAP-SIM/AKA request for UE 12 with EAP-SIM/AKA server 52 for 3GPP AAA element 18 can be proxied via PCRF 20 and the subscriber's IMSI can be signaled as a Chargeable User Identity (CUID) (as defined in RFC 4372) over RADIUS appended to an access accept message from 3GPP AAA element 18. In various embodiments, the WiFi access request signaling can be augmented with radio condition information, including, but not limited to, Received Signal Strength Indication (RSSI) level for the UE, Channel utilization, WAN bandwidth (BW) utilization, Received Channel Power Indicator (RCPI) level for the UE and/or Received Signal to Noise Indicator (RSNI) level for the UE.

Using the subscriber's IMSI included with the access accept message via the EAP dialogue as well as information related to whether and/or which kind of cellular access the user may be currently connected to, PCRF 20 can query the subscriber policy information obtained from SPR 22 via wireless policy database 44 to enhance the WiFi authorization decision. In various embodiments, the subscriber's policy information obtained from SPR 22 may include policies for the subscriber, which may allow authorizing the subscriber to connect to the WiFi access network (e.g., via wireless radio AP 34) if the subscriber is also connected to a 2G or 3G access network, but not if the user is also connected to an LTE access network. In various embodiments, a policy can be provisioned in which the subscriber may always be allowed to connect to the WiFi access network if the subscriber doesn't have a packet data protocol (PDP) active. In various embodiments, a policy can be provisioned in which the subscriber may be allowed to connect to the WiFi access network if the wireless RSSI level for the UE is above, below or equal to a certain Decibal-milliwatt (dBm) power threshold. In various embodiments, a policy can be provisioned in which the subscriber may be allowed to connect to the WiFi access network if the RSSI level is above, below, equal to, combinations thereof or the like to a certain dBm threshold and the subscriber is attached to a particular RAT type (e.g., 2G, 3G, 4G, etc.). In various embodiments, a policy can be provisioned in which the subscriber may be allowed to connect to the WiFi access network if the RCPI for the UE to which the subscriber is associated is above, below, equal to, combinations thereof or the like to a particular RCPI threshold. In various embodiments, a policy can be provisioned in which the subscriber may be allowed to connect to the WiFi access network if the RSNI for the UE to which the subscriber is associated is above, below, equal to, combinations thereof or the like to a particular RSNI threshold.

It should be understood that still other subscriber policies can be provisioned for enhancing the WiFi authorization decision. For example, in various embodiments, PCRF 20 can be provisioned with information via a wireless authorization database 46, which can enable the PCRF to determine the load in a particular cell ID in communication system 10 (e.g. an ID of eNodeB 36 or eNodeB 38). [Note the terms 'cell', 'eNodeB' and 'NodeB' can be used interchangeably herein in this Specification.] In various embodiments, these capabilities can be further enhanced by provisioning PCRF 20 to include a mapping of wireless radio APs to overlapping 2G, 3G and/or LTE cell sites via wireless authorization database 46. For example, PCRF 20 can be enhanced with functionality via wireless authorization module 42, which may enable the PCRF to recover an access point ID for wireless radio AP 34 from the RADIUS signaling. Using Gx signaling, PCRF 20 can determine a 2G, 3G or LTE cell that is providing service to the IMSI (e.g., to the subscriber). Using one or more RATM techniques, PCRF 20 can to determine the load in the identified cellular cell id. In various embodiments, load determination techniques can include, but not be limited to, determining actual resource shortages in a RAN and/or using one or more predictive algorithms in the RAN.

PCRF 20 can use such load information to enhance WiFi authorization decisions for the subscriber associated with UE 12. In various embodiments, a policy can be provisioned in which the subscriber may be allowed to connect to the WiFi access network if the RSSI level, the RCPI level and/or the RSNI is within a particular range and the subscriber is attached to a particular RAT type (e.g., 2G, 3G, 4G, etc.) having a particular load less than (or equal to, or greater than, etc., depending on configuration) a particular load threshold for the corresponding RAT type.

In one or more additional embodiments, PCRF 20 can also be enhanced with functionality via wireless authorization module 42 to recover an International Mobile Station Equipment Identity (IMEI) for a given UE from an Equipment Identity AVP signaled over the Gx interface. In various embodiments, PCRF 20 can be provisioned with information via wireless authorization database 46 (e.g., including look-up table), which may include defined IMEI ranges paired with one or more WiFi/Cellular characteristics to enhance WiFi authorization decisions. For example, an IMEI range #1 can have WiFi or Cellular supported, an IMEI range #2 can have WiFi plus cellular supported and an IMEI range #3 can include WiFi support for 802.11ac. Accordingly, PCRF 20 can use IMEI information and WiFi/cellular characteristics enhance WiFi authorization decisions for a subscriber.

In one or more additional embodiments, PCRF 20 can be enhanced with functionality to detect when a previously authorized WiFi subscriber changes location. Changes of location may be realized through a change in WiFi AP, a change in cellular base station and/or a change in radio technology. The changes may be signaled using AAA signaling, for example using RADIUS or DIAMETER/Gx signaling. For such enhancements, PCRF 20 may be operable via wireless authorization module 42 to re-evaluate policy decisions based on location changes. For example, when a given UE previously authorized to access the WiFi access network has its authorization status updated, PCRF 20 can signal, e.g., using a RADIUS Change of Authorization (CoA) message, that the WiFi session for the subscriber needs to be re-authenticated/re-authorized. The result of the re-authentication/re-authorization can result in a change in the WiFi resources authorized to be accessed by the subscriber. For example, the subscriber can be denied access to the WiFi access network or the user can have their quality of service (QoS)/rate limits increased or decreased. Accordingly, PCRF 20 can use location change information to enhance WiFi authorization decisions for a subscriber.

Accordingly, the solution provided by communication system 10 may provide for an enhanced RATM approach to enhance wireless access network authorization decisions, which may improve user experience in areas where simultaneous access to multiple wireless networks is available.

The EPC generally comprises an MME, an SGSN, an SGW, a PGW/GGSN and a PCRF. The components may be used to provide various UE services and/or functions and to implement Quality of Service (QoS) on packet flows. The services and functions may be used, for example, to provision enhanced services such as enhanced charging, stateful firewalls and/or traffic performance optimization (TPO). The MME is the primary control element for the EPC. Among other things, the MME provides for UE tracking and paging procedures including, for example, retransmissions, tracking area list management, idle mode UE tracking, etc. For example, the MME can maintain tracking information for UE regarding previous and current information for UE transitions between or within Radio Access Networks (RANs). The MME further provides for UE bearer procedures including activation, deactivation and modification and SGW and PGW selection for UE and authentication services.

The SGW is a data plane element that can manage user mobility and interfaces with RANs. The SGW also maintains data paths between eNodeBs and the PGW/GGSN. The PGW/GGSN provides IP connectivity access network (IP-CAN) session connectivity for UEs to external packet data networks (PDNs), such as, for example internet 60. The SGSN may provide access for legacy Universal Mobile Telecommunications System (UMTS) network devices. For example, UE on the GERAN can communicate through the SGSN to the SGW or the PGW/GGSN to support communication with legacy systems that may include GnGp-SGSNs. In another example, UE on the UTRAN can communicated to the SGW via the SGSN and a NodeB/RNC.

Generally, RANs in an EPS architecture consist of eNodeBs (also known as eNBs). An eNodeB is generally connected directly to an EPC, as well as to adjacent eNodeBs. Connections with adjacent eNodeBs may allow calls to be routed more directly. An eNodeB is also responsible for selecting an MME for UE, managing radio resources, and making handover decisions for UE. In some embodiments, RANs can also include NodeBs/RNCs to provide cellular coverage for legacy 2G and/or 3G cellular systems. A NodeB/RNC is responsible for managing radio resources, providing measurement reporting comments and assisting in handoff/handover scenarios for UE. In some embodiments a NodeB/RNC alternately provide for load control, admission control, packet scheduling, security functions, etc.

In addition to the features described herein, PCRF 20 may also decide policy control and/or charging activities to apply to UE for cellular services such as 2G, 3G and/or 4G/LTE-based on various PCC rules. In some embodiments, PCRF 20 can be configured to use user subscription information as a basis for the policy and charging control decisions. The subscription information may apply for both session-based and non-session based services. PCRF 20 may be referred to generally as a policy server. Additionally, PCRF 20 may determine PCC rules based on an application or service described to the PCRF from AF 24. In various embodiments, AF 24 may describe applications/services to PCRF 20 that may require dynamic policy and/or charging control for one or more UE. The dynamic policy and/or charging controls may include, but not be limited to, controlling the detection for service data flows, setting charging instructions for service data flows, setting QoS levels for service data flows and/or gating. PCRF 20 may communicate PCC rules to PGW/GGSN 14, which may serve as a policy enforcement point to manage QoS, online/offline flow-based charging, data generation, deep-packet inspection and intercept for cellular services.

In addition to the features described herein, 3GPP AAA element 18 is a network element responsible for accounting, authorization and authentication functions for UE 12. For AAA considerations, 3GPP AAA element 18 may provide a mobile node IP address and the accounting session identification (Acct-Session-ID) and other mobile node states in appropriate messaging (e.g., via access-Request/access-Response messages). Authentication refers to the process where an entity's identity is authenticated, typically by providing evidence that it holds a specific digital identity such as an identifier and the corresponding credentials. The authorization function determines whether a particular entity is authorized to perform a given activity, typically inherited from authentication when logging on to an application or service.

Authorization may be determined based on a range of restrictions, for example time-of-day restrictions, or physical location restrictions, or restrictions against multiple accesses by the same entity or user. Accounting refers to the tracking of network resource consumption by users for the purpose of capacity and trend analysis, cost allocation, billing, etc. In addition, it may record events such as authentication and authorization failures, and include auditing functionality, which permits verifying the correctness of procedures carried out based on accounting data. In various embodiments, communication system 10 may be provisioned with other AAA services and/or other AAA servers/elements, which may provide AAA considerations for the system.

In addition to the features described herein, SPR 22 can contain subscriber/subscription related information needed for subscription-based policies and IP-CAN bearer level PCC rules implemented by the PCRF. In some embodiments, SPR 22 may be combined with or distributed across other databases in communication system 10. In some embodiments, SPR 22 can also provide subscription profile information for one or more PDNs, which may include, but not be limited to a subscriber's allowed services; information on a subscriber's allowed QoS; a subscriber's charging related information (e.g., location information relevant for charging); and a subscriber category.

Wireless LAN controller 32 may be responsible for system wide wireless LAN functions, such as security policies, intrusion prevention, RF management, QoS, and mobility. In various embodiments, Wireless LAN controller 32 may be in communication with PGW/GGSN 14 via a wireless access gateway (not shown).

Wireless radio AP 34 can offer suitable connectivity to a wired network using WiFi, or, in some embodiments, Bluetooth, WiMAX or any other appropriate standard. Wireless radio AP 34 may encompass wireless network appliances such as a WiFi array, a wireless bridge (e.g., between networks sharing a same Service Set Identifier (SSID) and radio channel) and/or a WLAN. In certain cases, an access point can connect to a router (via a wired network) that can relay data between UE and wired devices of a network.

UE 12 can be associated with clients or customers wishing to initiate a flow in communication system 10 via some network. The terms 'user equipment', 'mobile node', 'end user', 'and 'subscriber' are inclusive of devices used to initiate a communication, such as a computer, a personal digital assistant (PDA), a laptop or electronic notebook, a cellular telephone, an i-Phone®, i-Pad®, a Google® Droid® phone, an IP phone, or any other device, component, element, or object capable of initiating voice, audio, video, media, or data exchanges within communication system 10. UE 12 may also be inclusive of a suitable interface to the human user such as a microphone, a display, a keyboard, or other terminal equipment. UE 12 may also be any device that seeks to initiate a communication on behalf of another entity or element such as a program, a database, or any other component, device, element, or object capable of initiating an exchange within communication system 10.

Data, as used herein in this document, refers to any type of numeric, voice, video, media, or script data, or any type of source or object code, or any other suitable information in any appropriate format that may be communicated from one point to another. In certain embodiments, UE 12 may have a bundled subscription for network access and application services (e.g., voice), etc. Once an access session is established, the user can register for application services as well, without additional authentication requirements. There can be two different user data repositories (AAA databases): one for the access user profile and one for the application user profile. IP addresses can be assigned using dynamic host configuration protocol (DHCP), Stateless Address Auto-configuration, default bearer activation, etc., or any suitable variation thereof.

In various embodiments, service network 70 and internet 60 may include and/or overlap with one or more networks including a broadband IP network, a LAN, a WAN, a WLAN, a MAN, an Intranet, an Extranet, a virtual private network (VPN), or any other appropriate architecture or system that facilitates communications in a network environment. In various embodiments, service network 70 may overlap with or be included in internet 60.

Figure 2:
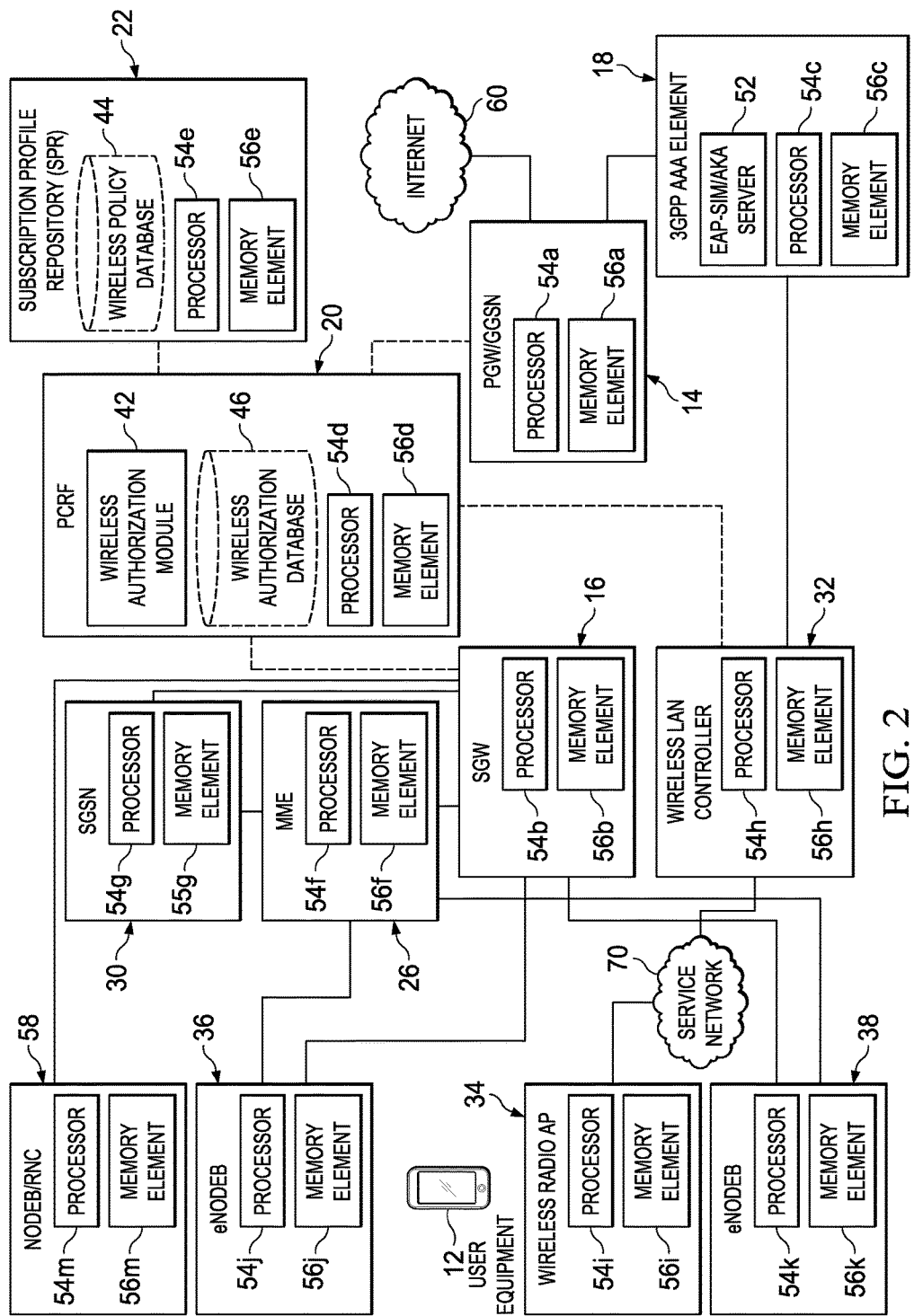
FIG. 2 is a simplified block diagram illustrating additional details associated with one potential embodiment of the communication system.

Turning to FIG. 2, FIG. 2 is a simplified block diagram illustrating additional details associated with one potential embodiment of communication system 10. FIG. 2 includes PGW/GGSN 14, SGW 16, 3GPP AAA element 18, PCRF 20, SPR 22, MME 26, SGSN 30, wireless LAN controller 32, wireless radio AP 34, eNodeBs 36, 38 and NodeB/RNC 58 of communication system 10. Each of these elements may include a respective processor 54a, 54b, 54c, 54d, 54e, 54f, 54g, 54h, 54i, 54j, 54k and 54m and a respective memory element 56a, 56b, 56c, 56d, 56e, 56f, 56g, 56h, 56i, 56j, 56k and 56m. 3GPP AAA element 18 may further include EAP-SIM/AKA server 52; PCRF 20 may further include wireless authorization module 42; and SPR 22 may further include wireless policy database 44, which may be provisioned with one or more per subscriber wireless access and/or cellular access policy definitions. In various embodiments, PCRF 20 may be further provisioned with a wireless authorization database 46, which can be provisioned with information including, but not limited to wireless radio AP ID information, cell ID information, a mapping of wireless radio APs in relation to one or more overlapping cell IDs, cell RAT type, IMEI information/ranges in relation to one or more wireless and/or cellular services, system load information, etc. Also shown in FIG. 2 are UE 12, internet 60 and service network 70.

Hence, appropriate software and/or hardware can be provisioned in PGW/GGSN 14, SGW 16, 3GPP AAA element 18, PCRF 20, SPR 22, MME 26, SGSN 30, wireless LAN controller 32, wireless radio AP 34, eNodeBs 36, 38 and NodeB/RNC 58 in order to facilitate providing RATM based enhanced wireless authorization determinations in the network environment of communication system 10. Note that in certain examples, certain databases can be consolidated with memory elements (or vice versa), or the storage can overlap/exist in any other suitable manner.

In one example implementation, PGW/GGSN 14, SGW 16, 3GPP AAA element 18, PCRF 20, SPR 22, MME 26, SGSN 30, wireless LAN controller 32, wireless radio AP 34, eNodeBs 36, 38 and NodeB/RNC 58 are network elements, which are meant to encompass network appliances, servers, routers, switches, gateways, bridges, loadbalancers, firewalls, processors, modules, or any other suitable device, component, element, or object operable to exchange information that facilitates or otherwise helps to provide RATM based enhanced wireless authorization determinations (e.g., for networks such as those illustrated in FIGS. 1 and 2). In other embodiments, these operations and/or features may be provided external to these elements, or included in some other network device to achieve this intended functionality. Alternatively, one or more of these elements can include software (or reciprocating software) that can coordinate in order to achieve the operations and/or features, as outlined herein. In still other embodiments, one or more of these devices may include any suitable algorithms, hardware, software, components, modules, interfaces, or objects that facilitate the operations thereof. This may be inclusive of appropriate algorithms and communication protocols that allow for the effective exchange of data or information.

In regards to the internal structure associated with communication system 10, each of PGW/GGSN 14, SGW 16, 3GPP AAA element 18, PCRF 20, SPR 22, MME 26, SGSN 30, wireless LAN controller 32, wireless radio AP 34, eNodeBs 36, 38 and NodeB/RNC 58 can each include respective memory elements for storing information to be used in achieving the RATM based enhanced wireless authorization determinations, as outlined herein. Additionally, each of these devices may include respective processors that can execute software or an algorithm to perform the RATM based enhanced wireless authorization determination activities as discussed in this Specification. These devices may further keep information in any suitable memory element [e.g., random access memory (RAM), read only memory (ROM), an erasable programmable read only memory (EPROM), an application specific integrated circuit (ASIC), etc.], software, hardware, or in any other suitable component, device, element, or object where appropriate and based on particular needs. Any of the memory items discussed herein should be construed as being encompassed within the broad term 'memory element'. In various embodiments, the information being tracked or sent to PGW/GGSN 14, SGW 16, 3GPP AAA element 18, PCRF 20, SPR 22, MME 26, SGSN 30, wireless LAN controller 32, wireless radio AP 34, eNodeBs 36, 38 and NodeB/RNC 58 could be provided in any database, register, control list, cache, or storage structure: all of which can be referenced at any suitable timeframe. Any such storage options may be included within the broad term 'memory element' as used herein. Similarly, any of the potential processing elements, modules, and machines described herein should be construed as being encompassed within the broad term 'processor'. Each of the network elements and user equipment can also include suitable interfaces for receiving, transmitting, and/or otherwise communicating data or information in a network environment.

Note that in certain example implementations, the RATM based enhanced wireless authorization determination activities, as outlined herein, may be implemented by logic encoded in one or more tangible media, which may be inclusive of non-transitory media (e.g., embedded logic provided in an ASIC, in digital signal processing (DSP) instructions, software [potentially inclusive of object code and source code] to be executed by a processor, or other similar machine, etc.). In some of these instances, memory elements [as shown in FIG. 2] can store data or information used for the operations described herein. This includes the memory elements being able to store software, logic, code, or processor instructions that are executed to carry out the activities described herein.

A processor can execute any type of instructions associated with the data or information to achieve the operations detailed herein. In one example, processors [as shown in FIG. 2] can transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), a DSP processor, an EPROM, an electrically erasable programmable read only memory (EEPROM)) or an ASIC that includes digital logic, software, code, electronic instructions, or any suitable combination thereof.

Figure 3:
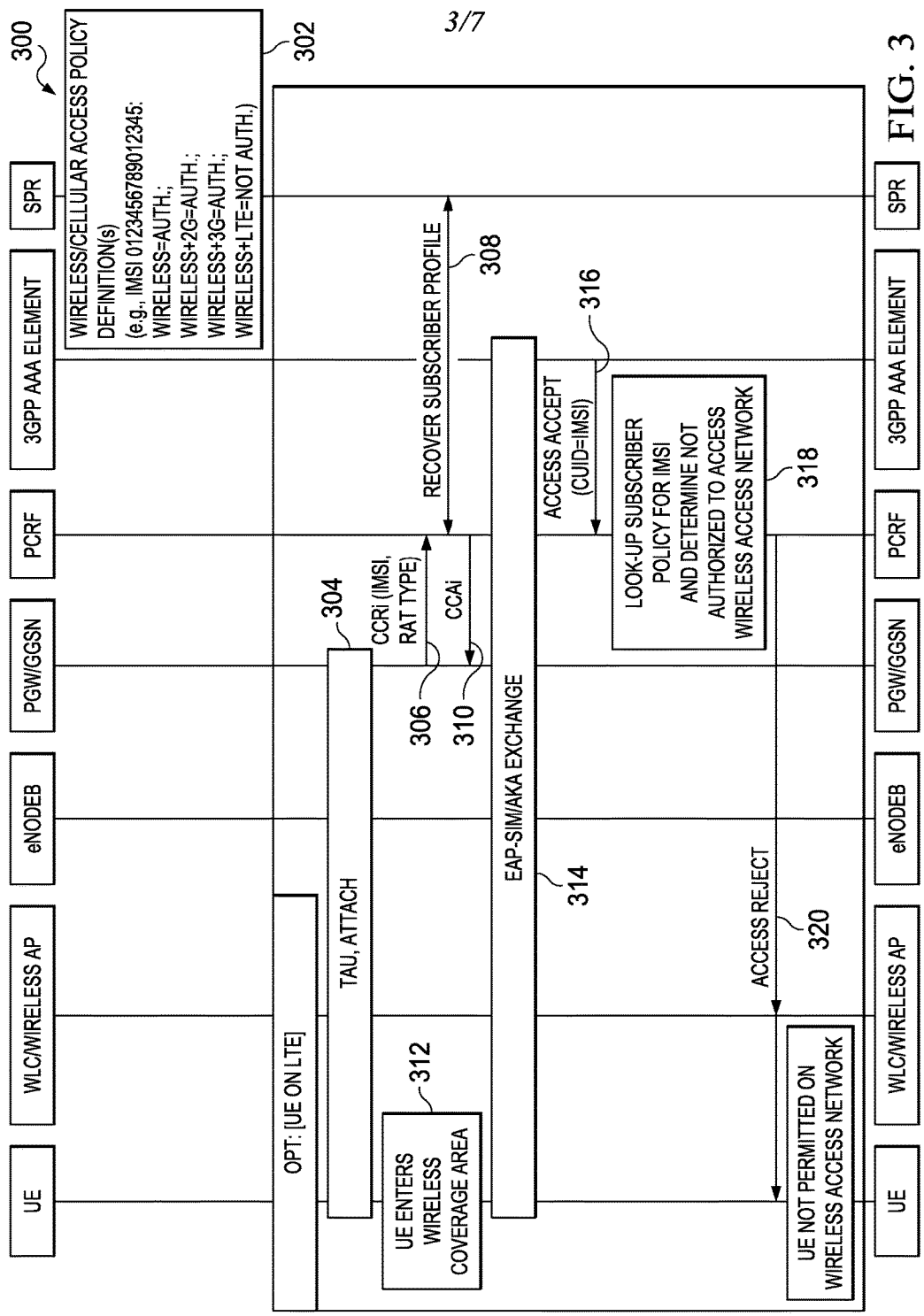
FIG. 3 is a simplified flow diagram illustrating potential flows and activities associated with providing RATM based enhanced wireless authorization determinations for a subscriber in accordance with one potential embodiment of the communication system.

Turning to FIG. 3, FIG. 3 is a simplified flow diagram 300 illustrating potential flows and activities associated with providing RATM based enhanced wireless authorization determinations for a subscriber in accordance with one potential embodiment of communication system 10. In one example embodiment, these flows and activities may be carried out via UE 12, WLC 32/wireless radio AP 34 (e.g., providing for a wireless access network), eNodeB 36 (note the operations could equally be carried out via eNodeB 38), PGW/GGSN 14, PCRF 20 and SPR 22.

As illustrated in flow diagram 300 shown in FIG. 3, the flows and activities may begin at 302 where SPR 22 may be provisioned (e.g., via wireless policy database 44) with one or more wireless access and/or cellular access policy definitions for a subscriber associated with UE 12. As shown at 302, the wireless/cellular access policy definitions may include the IMSI of the subscriber associated with UE 12 and definitions including: if attempting to access the wireless access network only, then the subscriber is authorized to access the wireless access network (e.g., access wireless radio AP 34); if attempting to access the wireless access network and if the subscriber is currently accessing the 2G access network (e.g., GERAN), then the subscriber is authorized to access the wireless access network (e.g., access wireless radio AP 34); if attempting to access the wireless access network and if the subscriber is currently accessing the 3G access network (e.g., UTRAN), then the subscriber is authorized to access the wireless access network (e.g., access wireless radio AP 34); and if attempting to access the wireless access network and the subscriber is currently accessing the LTE access network (e.g., E-UTRAN), then the subscriber is not authorized to access the wireless access network (e.g., not authorized to access wireless radio AP 34). These example access policy definitions are provided for illustrative purposes only and are not meant to limit the broad scope of the present disclosure. It should be understood that any wireless/cellular access policy definitions can be provided and/or configured for subscribers within the scope of the present disclosure.

FIG. 3 illustrates an option where UE 12 is accessing the LTE access network (e.g., E-UTRAN) via eNodeB 36. As shown at 304, UE 12 may perform a TAU and/or Attach Request to the LTE access network. At 306, PGW/GGSN 14 may communicate a CCRi request message using standardized Gx signaling to PCRF 20 including the subscriber's IMSI and the RAT type for the request. At 308, PCRF 20 may recover the subscriber's profile from SPR (e.g., via wireless policy database 44). In this manner, PCRF 20 may become aware of both the subscriber's wireless/cellular access policy(s) for wireless access determinations and also the RAT type for the cellular services that the subscriber is accessing. In various embodiments, PCRF 20 may become aware of other information using Gx signaling, which can be used in enhancing wireless authorization determinations such as, for example, UE IMEI, cell ID, load information, etc. At 310, PCRF 20 may respond to PGW/GGSN 14 with an initial Credit Control Answer message, generally referred to as a 'CCAi' response message.

At 312, the subscriber/UE 12 may transition into wireless coverage area 34a provided by wireless radio AP 34. Entering the wireless coverage area may initiate an EAP-SIM/AKA exchange between UE 12 and 3GPP AAA element 18 (e.g., via EAP-SIM/AKA server 52), as shown at 314. For the exchange, PCRF 20 may serve as a proxy for a UE 12 EAP Access Request message communicated to 3GPP AAA element 18. In various embodiments, the EAP-SIM/AKA exchange can also be used to provide PCRF 20 with other information such as, for example, RSSI for UE 12, RCPI for UE 12, RSNI for UE 12, wireless radio AP 34 name/ID, UE location changes, etc., which can be appended to the Access Request message for UE 12 communicated to 3GPP AAA element 18 via WLC 32. At 316, 3GPP AAA element 18 may communicate an Access Accept message using RADIUS signaling to PCRF 20 indicating that the subscriber/UE is authorized to access the wireless access network via wireless radio AP 34. The Access Accept message may be appended with CUID set to the subscriber's IMSI. In this manner, PCRF 20 may become aware of the particular subscriber/UE attempting to access wireless radio AP 34.

At 318, PCRF 20 may look-up the corresponding wireless/cellular access policy for the received IMSI (e.g., the IMSI for the subscriber associated with UE 12) and may determine that the subscriber is not authorized to access the wireless access network via wireless radio AP 34 (e.g., based on the policy definition stipulating that since the subscriber is attempting to access the wireless access network and the subscriber is currently accessing the LTE access network, then the subscriber is not authorized to access the wireless access network). In this manner, wireless network information gathered/received by PCRF 20 may enable PCRF 20 to provide enhanced wireless authorization determinations for communication system 10. At 320, PCRF 20 may communicate an Access Reject message to WLC 32, which may be relayed to UE 12, indicating that the UE is not permitted on the wireless access network.

Figure 4:
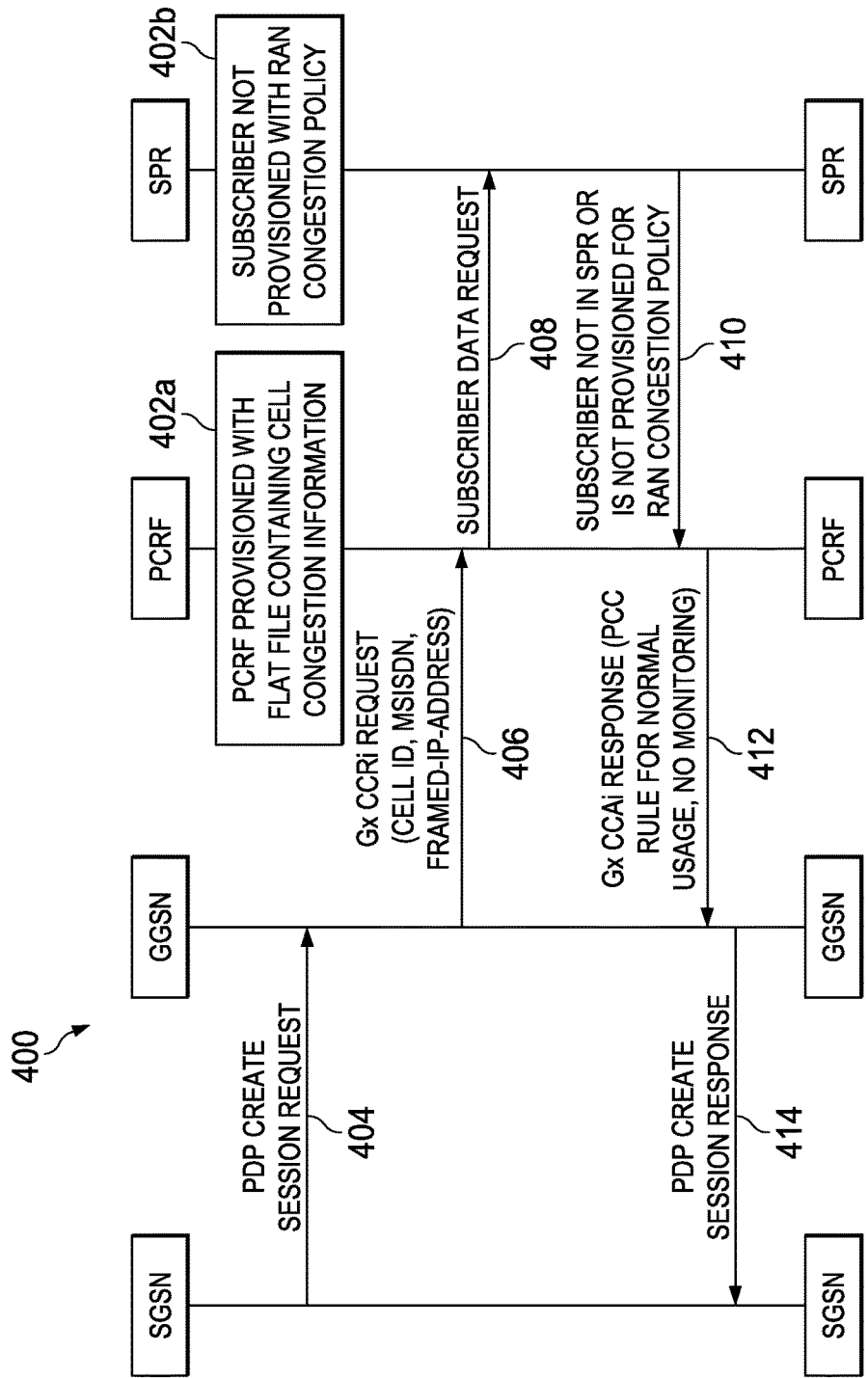
FIG. 4 is a simplified flow diagram illustrating potential flows and activities associated with quality of service (QoS) flows for a subscriber in accordance with one potential embodiment of the communication system.

Referring to FIG. 4, FIG. 4 is a simplified flow diagram 400 illustrating potential flows and activities associated with QoS flows for a subscriber associated with UE 12 in relation to particular RAN congestion conditions for a cell being accessed by UE 12. For FIG. 4, it is assumed that UE 12 is accessing a particular 3G cell (e.g., NodeB/RNC 58) that is not experiencing congestion and that the subscriber associated with UE 12 is a non-high usage subscriber. In one example embodiment, the flows and activities shown in FIG. 4 may be carried out via SGSN 30, PGW/GGSN 14 (note only the GGSN portion of PGW/GGSN 14 is shown in FIG. 4), PCRF 20 and SPR 22. FIG. 4 illustrates one example in which PCRF 20 may gain cellular information for UE 12.

For FIG. 4, it is assumed that a given UE (e.g., UE 12) is performing an Attach Request via the 3G cell to create a PDP session with a PDN, for example, internet 60. Although FIG. 4 is referenced with respect to an Attach Request, it should be understood that a location area update (LAU) and/or routing area update (RAU) could be used for PCRF to gain cellular information for UE 12.

As shown in FIG. 4 at 402a, PCRF 20 may be provisioned with a flat file of a table containing cell congestion information. In various embodiments, cell congestion information can include, but not be limited to cell ID and corresponding load information for corresponding cells. In various embodiments, PCRF 20 may be provisioned with the cell congestion information via wireless authorization database 46 or any other similar database. In various embodiments, the cell congestion information may be provisioned for the 3G RAN, including cell congestion information for NodeB/RNC 58; may be provisioned the 2G RAN, also including cell congestion information for NodeB/RNC 58; may be provisioned for the 4G/LTE/LTE-A RAN, including cell congestion information for eNodeBs 36, 38 or any combination thereof. In various embodiments, the cell congestion information can be statically defined (e.g., using historical measurements). In various embodiments, cell congestion information can be dynamically updated using one or more load determination techniques. For FIG. 4, it is assumed that the cell congestion information for NodeB/RNC 58 indicates that the cell is not congested at the time UE 12 is attempting to create a session. As shown at 402b, SPR 22 may not be provisioned with a RAN congestion policy for the subscriber associated with UE 12 for the 3G RAN.

As shown at 404, SGSN 30 may communicate a PDP Create Session Request message to the GGSN. At 406, using standardized Gx signaling, the GGSN may communicate a CCRi request message to PCRF 20 including the cell ID for NodeB/RNC 58, the MSISDN of the subscriber associated with UE 12, and the framed-IP-address of UE 12. At 408, PCRF 20 may initiate a subscriber data request to SPR 22. At 410, SPR 22 may return an indication that the subscriber is not in the SPR or is not provisioned for a RAN congestion policy. At 412, using standardized Gx signaling, PCRF 20 may communicate a CCAi response message to the GGSN including a PCC rule indicating normal usage for the subscriber and no monitoring of the subscriber. At 414, the GGSN may communicate a PDP Create Session Response message to SGSN 30, which can be relayed to UE 12 via appropriate signaling mechanisms. Thus, as shown in FIG. 4, PCRF 20 can gather/receive cellular access information for UE using standardized Gx signaling, which can further be used to enhance wireless authorization determinations for UE.

Figure 5A:
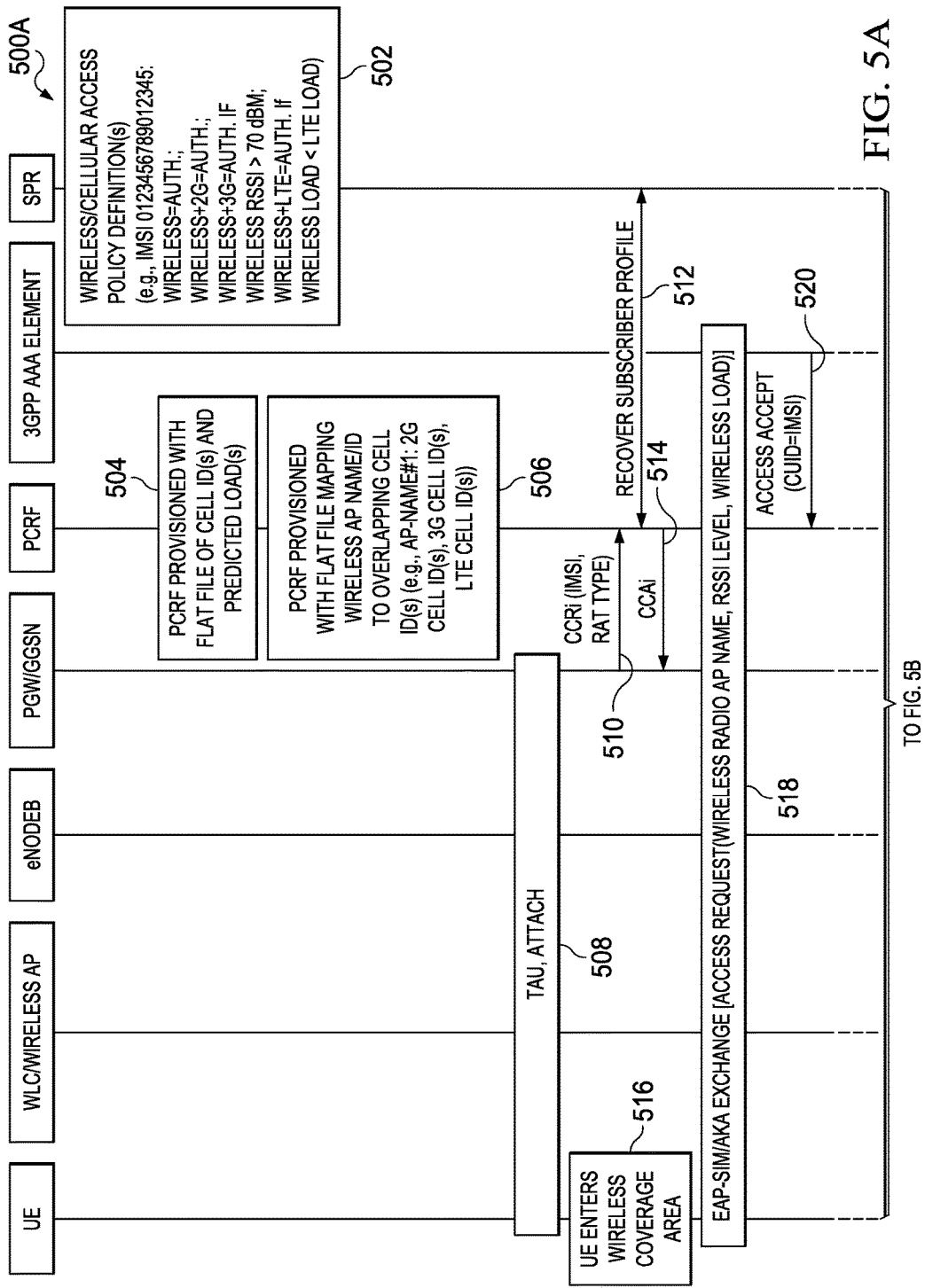

Referring to FIGS. 5A-5B, FIGS. 5A-5B are simplified flow diagrams illustrating potential flows and activities associated with providing RATM based enhanced wireless authorization determinations for a subscriber including load based authorization determinations in accordance with one potential embodiment of the communication system. In one example embodiment, the flows and activities as shown in FIGS. 5A-5B may be carried out via UE 12, WLC 32/wireless radio AP 34 (e.g., providing for a wireless access network), eNodeB 36 (note the operations could equally be carried out via eNodeB 38), PGW/GGSN 14, PCRF 20 and SPR 22.

As illustrated in FIG. 5A, the flows and activities may begin at 502 where SPR 22 may be provisioned (e.g., via wireless policy database 44) with one or more wireless access and/or cellular access policy definitions for a subscriber associated with UE 12. As shown at 502, the wireless/cellular access policy definitions may include the IMSI of the subscriber associated with UE 12 and definitions including: if attempting to access the wireless access network only, then the subscriber is authorized to access wireless radio AP 34; if attempting to access the wireless access network and if the subscriber is currently accessing the 2G access network (e.g, GERAN), then subscriber is authorized to access the wireless access network (e.g., access wireless radio AP 34) if attempting to access the wireless access network and if the subscriber is currently accessing the 3G access network (e.g., UTRAN) and if the RSSI for UE 12 is greater than 70 dBm, then the subscriber is authorized to access the wireless access network (e.g., access wireless radio AP 34); and if attempting to access the wireless access network and if the subscriber is currently accessing the LTE access network (e.g., E-UTRAN) and if the wireless access network load is less than the LTE load, then the subscriber is authorized to access the wireless access network (e.g, access wireless radio AP 34). Otherwise, for the LTE access network case, if the wireless access network load is greater than or equal to the LTE load, the subscriber is not authorized to access the wireless access network (e.g., not authorized to access wireless radio AP 34). These example access policy definitions are provided for illustrative purposes only and are not meant to limit the broad scope of the present disclosure. It should be understood that any wireless/cellular access policy definitions can be provided and/or configured for subscribers within the scope of the present disclosure.

At 504, PCRF 20 may be provisioned with a flat file containing one or more cell ID(s) and corresponding predicted load(s) for the corresponding cell(s). In various embodiments, the predicted load(s) can be based on historical measurements of corresponding cell ID(s). At 506, PCRF 20 may be provisioned with a flat file mapping the name/ID of wireless radio AP 34 to one or more cell IDs having a coverage area overlapping the coverage area 34a of wireless radio AP 34. In various embodiments, the file can include the name for wireless radio AP 34 linked in relation to one or more 2G cell ID(s), one or more 3G cell ID(s) and/or one or more 4G/LTE/LTE-A cell ID(s) having coverage areas overlapping the coverage area of wireless radio AP 34.

In various embodiments, provisioning PCRF 20 may include provisioning PCRF 20 with a preconfigured file mapping cell ID(s) and corresponding covered wireless radio AP(s) and/or provisioning PCRF with a mapping of cell ID(s) and corresponding covered wireless radio AP(s) provided by one or more external mapping services. In one example, eNodeBs 36, 38 and NodeB/RNC 58, as shown in FIG. 1, each having respective coverage areas 36a, 38a and 58a that overlap with coverage area 34a of wireless radio AP 34 could be mapped into the file thereby provisioning PCRF 20 with a mapping of overlapping cellular coverages for wireless radio AP 34. In various embodiments, PCRF 20 may be provisioned with the cell ID(s), load(s) and/or overlapping cell information via wireless authorization database 46 or any other similar database.

FIG. 5A illustrates an example use case where UE 12 is accessing the LTE access network (e.g., E-UTRAN) via eNodeB 36. Thus, it is assumed for the example use case shown in FIG. 5A that the flat file mapping the name of wireless radio AP 34 to one or more overlapping cell ID(s) includes, at least in part, a cell ID for eNodeB 36. As shown at 508, UE 12 may perform a TAU and/or Attach Request to the LTE access network. At 510, PGW/GGSN 14 may communicate a CCRi request message using standardized Gx signaling to PCRF 20 including the subscriber's IMSI and the RAT type for the request. At 512, PCRF 20 may recover the subscriber's profile from SPR 22 (e.g., via wireless policy database 44). In this manner, PCRF 20 may become aware of both the subscriber's wireless/cellular access policy(s) for wireless access determinations and also the RAT type for the wireless network that the subscriber is currently accessing. In various embodiments, PCRF 20 may become aware of other information using Gx signaling, which can be used in enhancing wireless authorization determinations such as, for example, UE IMEI, cell ID, current load information, etc. At 514, PCRF 20 may respond to PGW/GGSN 14 with a CCAi response message.

At 516, the subscriber/UE 12 may transition into wireless coverage area 34a provided by wireless radio AP 34. Entering the wireless coverage area may initiate an EAP-SIM/AKA exchange between UE 12 and 3GPP AAA element 18 (e.g., via EAP-SIM/AKA server 52), as shown at 518. For the exchange, PCRF 20 may serve as a proxy for a UE 12 EAP Access Request message communicated to 3GPP AAA element 18 via WLC 32. The Access Request message may be appended with wireless radio AP 34 name, RSSI level and wireless network load. In some embodiments, predicted wireless load for wireless radio AP 34 may also be provisioned in the flat file containing predicted loads for corresponding cell ID(s).

At 520, 3GPP AAA element 18 may communicate an Access Accept message using RADIUS signaling to PCRF 20 indicating that the subscriber/UE is authorized to access the wireless access network (e.g., access wireless radio AP 34). The Access Accept message may be appended with CUID set to the subscriber's IMSI. In this manner, PCRF 20 may become aware of the particular subscriber/UE attempting to access the wireless access network.

The flows and activities of FIG. 5A may continue to the flows and activities shown in flow diagram 500B of FIG. 5B. Based on the Access Accept message received from 3GPP AAA element 18, at 522, PCRF 20 may look-up the wireless/cellular access policy for the subscriber associated with the IMSI (e.g., the subscriber associated with UE 12). Also at 522, PCRF 20 may look-up the one or more overlapping cell ID(s) for the RAT type that UE 12 is currently accessing (e.g., the cell ID for eNodeB 36). Further at 522, PCRF 20 may compare the information gathered via the look-ups with data appended to the Access Request message for UE 12 communicated from WLC 32 to determine whether or not UE 12 is authorized to the wireless access network.

In one option say, for example, that the wireless access network load is greater than the LTE access network load, PCRF 20 may reject the UE request to access the wireless access network (e.g., reject access to wireless radio AP 34) and, at 524, may communicate an Access Reject message to WLC 32, which may be relayed to UE 12 indicating that the UE is not permitted to access the wireless access network. In another option say, for example, that the wireless access network load is less than the LTE access network load, PCRF may accept the UE request to the wireless access network (e.g., access wireless radio AP 34) and, at 526, may communicate an Access Accept message to WLC 32, which may be relayed to UE 12 indicating that the UE is permitted to access the wireless access network. Thus, as shown in FIGS. 5A-5B, PCRF 20 can be enhanced with functionality (e.g., via wireless authorization module 42) to provide for RATM based enhanced wireless authorization decisions for subscribers attempting to access a wireless access network.

Figure 6:
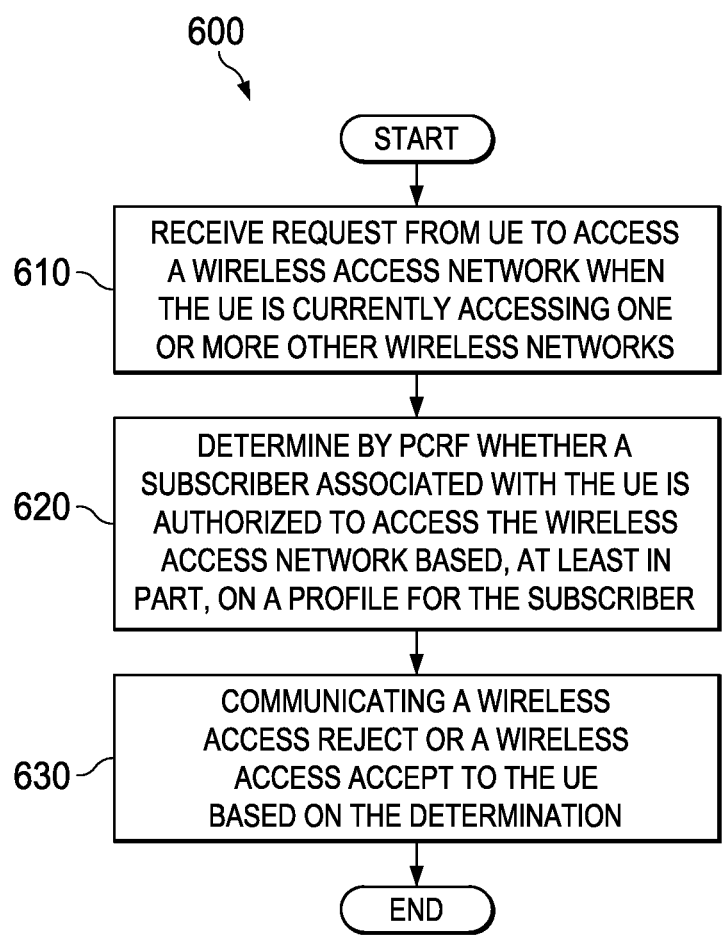
FIG. 6 is a simplified flow diagram illustrating example operations associated with providing RATM based enhanced wireless authorization determinations in accordance with one potential embodiment of the communication system.

Turning to FIG. 6, FIG. 6 is a simplified flow diagram 600 illustrating example operations associated with providing RATM based enhanced wireless authorization determinations in one example embodiment of communication system 10. In one example embodiment, these operations may be carried out using wireless radio access point 34, wireless LAN controller 32, eNodeB 36 (and/or eNodeB 38, NodeB/RNC 58), PGW/GGSN 14, PCRF 20, 3GPP AAA element 18 and SPR 22. Note wireless radio AP 34 and wireless LAN controller 32 may collectively be referred to as a wireless access network.

At any time upon entering wireless coverage area 34a, a particular UE (e.g., UE 12) may attempt to attach to wireless radio AP 34 to access the wireless access network. Thus, processing may start at 610 when an access request to access the wireless access network may be received from UE 12 when UE 12 is currently accessing one or more other wireless networks (e.g., 2G, 3G, 4G/LTE, etc.). The request may be proxied via PCRF 20 with 3GPP AAA element 18. At 620, PCRF 20 may determine whether a subscriber associated with UE 12 is authorized to access the wireless access network based, at least in part, on a profile for the subscriber. In various embodiments, the determination can further be based on loads and/or predicted loads for cell ID(s) of the one or more other wireless networks having coverage area(s) overlapping with wireless coverage area 34a. At 630, PCRF 20 may communicate a wireless access rejection (e.g., an access reject message) or a wireless access acceptance (e.g., an access accept message) to UE 12 based on the determination.

Note that with the examples provided above, as well as numerous other examples provided herein, interaction may be described in terms of two, three, or four network elements. However, this has been done for purposes of clarity and example only. In certain cases, it may be easier to describe one or more of the functionalities of a given set of flows by only referencing a limited number of network elements. It should be appreciated that communication system 10 (and its teachings) are readily scalable and can accommodate a large number of components, as well as more complicated/sophisticated arrangements and configurations. Accordingly, the examples provided should not limit the scope or inhibit the broad teachings of communication system 10 as potentially applied to a myriad of other architectures.

It is also important to note that the steps in the appended diagrams illustrate only some of the possible signaling scenarios and patterns that may be executed by, or within, communication system 10. Some of these steps may be deleted or removed where appropriate, or these steps may be modified or changed considerably without departing from the scope of teachings provided herein. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by communication system 10 in that any suitable arrangements, chronologies, configurations, and timing mechanisms may be provided without departing from the teachings provided herein.

Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain network flows, and signaling protocols, communication system 10 may be applicable to other exchanges, routing protocols, or routed protocols to provide for providing RATM based enhanced wireless authorization determinations in a network. Moreover, although communication system 10 has been illustrated with reference to particular elements and operations that facilitate the communication process, these elements and operations may be replaced by any suitable architecture or process that achieves the intended functionality of communication system 10.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:
1. A method for a communication network comprising:
configuring at least one memory element in a 3rd Generation Partnership Project (3GPP) Policy and Charging Rules Function (PCRF) with a list of one or more wireless radio access points in a wireless local area network (WLAN) in relation to cell information for one or more cells of one or more Radio Access Technology (RAT) types of one or more 3GPP access networks, wherein each of the one or more cells provide a coverage area overlapping each of the one or more wireless radio access points;
receiving, by a packet data network gateway (PGW) a request from a user equipment (UE) to access the WLAN, wherein the UE is currently accessing a 3GPP access network of the one or more 3GPP access networks;
sending a credit control request (CCR) message from the PGW to the 3GPP PCRF based on the request received from the UE by the PGW, wherein the CCR message comprises a RAT type indicator for the 3GPP access network that the UE is currently accessing;
receiving an access accept message by the 3GPP PCRF from a 3GPP Authentication, Authorization and Accounting (AAA) element, wherein the access accept message comprises a Chargeable User Identity (CUID) set to identify an International Mobile Subscriber Identity (IMSI) for a subscriber associated with the UE;

determining by the 3GPP PCRF whether the subscriber associated with the UE is authorized to access the WLAN based, at least in part, on a profile for the subscriber; and communicating one of a wireless access rejection and a wireless access acceptance to the UE based on the determination.

2. The method of claim 1, wherein the determining includes recovering, by the 3GPP PCRF, the profile for the subscriber associated with the UE from a Subscriber Profile Repository (SPR) using the IMSI for the subscriber.

3. The method of claim 1, wherein the profile for the subscriber indicates at least one of:
whether the subscriber is allowed to access the WLAN;
whether the subscriber is allowed to access the WLAN in combination with accessing the one or more 3GPP access networks using one or more particular RAT types; and
whether the subscriber is allowed to access the WLAN in combination with accessing the one or more 3GPP access networks using the one or more particular RAT types for one or more network conditions.

4. The method of claim 3, wherein one or more network conditions include at least one of:
whether a received signal strength indicator (RSSI) for the UE is above, below or equal to a particular RSSI threshold;
whether a received channel power indicator (RCPI) for the UE is above, below or equal to a particular RCPI threshold;
whether a received signal to noise indicator (RSNI) for the UE is above, below or equal to a particular RSNI threshold;
whether a load of a particular RAT type of the one or more particular RAT types is above, below or equal to a particular load threshold; and
whether at least one of an RSSI, RCPI or RSNI for the UE is within a predetermined range and whether the load of the particular RAT type is above, below or equal to a particular load threshold.

5. The method of claim 3, wherein a particular RAT type of the one or more particular RAT types includes at least one of:
a Global System for Mobile communications (GSM) Enhanced Data rates for GSM Evolution (EDGE) Radio Access Network (GERAN) RAT type;
a Universal Mobile Telecommunications System (UMTS) Terrestrial Radio Access Network (UTRAN) RAT type; and
an evolved UTRAN (E-UTRAN) RAT type.

6. The method of claim 1, further comprising:
configuring at least one memory element in the 3GPP PCRF with one or more predicted load thresholds for the one or more cells of the one or more RAT types of the one or more 3GPP access networks.

7. One or more non-transitory tangible media encoding logic that include instructions for execution by a processor, wherein the execution causes the processor to perform operations comprising:
configuring at least one memory element in a 3rd Generation Partnership Project (3GPP) Policy and Charging Rules Function (PCRF) with a list of one or more wireless radio access points in a wireless local area network (WLAN) in relation to cell information for one or more cells of one or more Radio Access Technology (RAT) types of one or more 3GPP access networks, wherein each of the one or more cells provide a coverage area overlapping each of the one or more wireless radio access points;

receiving, by a packet data network gateway (PGW), a request from a user equipment (UE) to access the WLAN, wherein the UE is currently accessing a 3GPP access network of the one or more 3GPP access networks;

sending a credit control request (CCR) message from the PGW to the 3GPP PCRF based on the request received from the UE by the PGW, wherein the CCR message comprises a RAT type indicator for the 3GPP access network that the UE is currently accessing;

receiving an access accept message by the 3GPP PCRF from a 3GPP Authentication, Authorization and Accounting (AAA) element, wherein the access accept message comprises a Chargeable User Identity (CUID) set to identify an International Mobile Subscriber Identity (IMSI) for a subscriber associated with the UE;

determining by the 3GPP PCRF whether the subscriber associated with the UE is authorized to access the-WLAN based, at least in part, on a profile for the subscriber; and communicating one of a wireless access rejection and a wireless access acceptance to the UE based on the determination.

8. The media of claim 7, wherein the determining includes recovering, by the 3GPP PCRF, the profile for the subscriber associated with the UE from a Subscriber Profile Repository (SPR) using the IMSI for the subscriber.

9. The media of claim 7, wherein the profile for the subscriber indicates at least one of:
whether the subscriber is allowed to access the WLAN;
whether the subscriber is allowed to access the WLAN in combination with accessing the one or more 3GPP access networks using one or more particular RAT types; and
whether the subscriber is allowed to access the WLAN in combination with accessing the one or more 3GPP access networks using the one or more particular RAT types for one or more network conditions.

10. The media of claim 9, wherein the one or more network conditions include at least one of:
whether a received signal strength indicator (RSSI) for the UE is above, below or equal to a particular RSSI threshold;
whether a received channel power indicator (RCPI) for the UE is above, below or equal to a particular RCPI threshold;
whether a received signal to noise indicator (RSNI) for the UE is above, below or equal to a particular RSNI threshold;
whether a load of a particular RAT type of the one or more particular RAT types is above, below or equal to a particular load threshold; and
whether at least one of an RSSI, RCPI or RSNI for the UE is within a predetermined range and whether the load of the particular RAT type is above, below or equal to a particular load threshold.

11. The media of claim 10, wherein a particular RAT type of the one or more particular RAT types includes at least one of:
a Global System for Mobile communications (GSM) Enhanced Data rates for GSM Evolution (EDGE) Radio Access Network (GERAN) RAT type;

a Universal Mobile Telecommunications System (UMTS) Terrestrial Radio Access Network (UTRAN) RAT type; and an evolved UTRAN (E-UTRAN) RAT type.

12. The media of claim 7, wherein the execution causes the processor to perform further operations comprising:

configuring at least one memory element in the 3GPP PCRF with one or more predicted load thresholds for the one or more cells of the one or more RAT types of the one or more 3GPP access networks.

13. A system, comprising:

a 3rd Generation Partnership Project (3GPP) Policy and Charging Rules Function (PCRF);

a memory element for storing data; and a processor for executing instructions associated with the data, wherein the executing causes the system to perform operations, comprising:

configuring the memory element in the 3GPP PCRF with a list of one or more wireless radio access points in a wireless local area network (WLAN) in relation to cell information for one or more cells of one or more Radio Access Technology (RAT) types of one or more 3GPP access networks, wherein each of the one or more cells provide a coverage area overlapping each of the one or more wireless radio access points;

receiving, by a packet data network gateway (PGW), a request from a user equipment (UE) to access the WLAN, wherein the UE is currently accessing a 3GPP access network of the one or more 3GPP access networks;

sending a credit control request (CCR) message from the PGW to the 3GPP PCRF based on the request received from the UE by the PGW, wherein the CCR message comprises a RAT type indicator for the 3GPP access network that the UE is currently accessing;

receiving an access accept message by the 3GPP PCRF from a 3GPP Authentication, Authorization and Accounting (AAA) element, wherein the access accept message comprises a Chargeable User Identity (CUID) set to identify an International Mobile Subscriber Identity (IMSI) for a subscriber associated with the UE;

determining by the 3GPP PCRF whether the subscriber associated with the UE is authorized to access the WLAN based, at least in part, on a profile for the subscriber; and communicating one of a wireless access rejection and a wireless access acceptance to the UE based on the determination.

14. The system of claim 13, wherein the profile for the subscriber indicates at least one of:

whether the subscriber is allowed to access the-WLAN;

whether the subscriber is allowed to access the WLAN in combination with accessing the one or more 3GPP access networks using one or more particular RAT types; and whether the subscriber is allowed to access the WLAN in combination with accessing the one or more 3GPP access networks using the one or more particular RAT types for one or more network conditions.

15. The system of claim 14, wherein the one or more network conditions includes at least one of:

whether a received signal strength indicator (RSSI) for the UE is above, below or equal to a particular RSSI threshold;

whether a received channel power indicator (RCPI) for the UE is above, below or equal to a particular RCPI threshold;

whether a received signal to noise indicator (RSNI) for the UE is above, below or equal to a particular RSNI threshold;

whether a load of a particular RAT type of the one or more particular RAT types is above, below or equal to a particular load threshold; and whether at least one of an RSSI, RCPI or RSNI for the UE is within a predetermined range and whether the load of the particular RAT type is above, below or equal to a particular load threshold.

16. The system of claim 13, wherein the executing causes the system to perform further operations, comprising:

configuring at least one memory element in the 3GPP PCRF with one or more predicted load thresholds for the one or more cells of the one or more RAT types of the one or more 3GPP access networks.

* * * * *

UNITED STATES PATENT AND TRADEMARK OFFICE
CERTIFICATE OF CORRECTION

PATENT NO. : 9,843,687 B2
APPLICATION NO. : 14/536642
DATED : December 12, 2017
INVENTOR(S) : Ian McDowell Campbell et al.

It is certified that error appears in the above-identified patent and that said Letters Patent is hereby corrected as shown below:

On the Title Page

In item (72), in Column 1, in "Inventors", Line 3, delete "Freemont," and insert -- Fremont, --, therefor.

On the page 4, in Column 1, under "Other Publications", Line 34, delete "Specificaton:" and insert -- Specification: --, therefor.

In the Specification

In Column 6, Line 57, delete "Decibal-milliwatt" and insert -- Decibel-milliwatt --, therefor.

In Column 15, Line 19, delete "34)" and insert -- 34;) --, therefor.

In the Claims

In Column 20, Lines 21-22, in Claim 7, delete "the-WLAN" and insert -- the WLAN --, therefor.

In Column 22, Line 10, in Claim 14, delete "the-WLAN;" and insert -- the WLAN; --, therefor.

Signed and Sealed this
Thirteenth Day of March, 2018

Andrei Iancu
*Director of the United States Patent and Trademark Office*